US009380622B2

(12) United States Patent  
Polisetty et al.

(10) Patent No.: US 9,380,622 B2
(45) Date of Patent: Jun. 28, 2016

(54) INCREASED POWER SAVINGS THROUGH COLLABORATIVE SEARCH

(71) Applicant: QUALCOMM Incorporated, San Diego, CA (US)

(72) Inventors: Chandra Mouli Polisetty, San Diego, CA (US); Deepti Mani, San Diego, CA (US); Umesh K. Pandey, Hyderabad (IN); Chandrasekar Srinivasan, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 294 days.

(21) Appl. No.: 13/717,866

(22) Filed: Dec. 18, 2012

(65) Prior Publication Data

US 2014/0169244 A1 Jun. 19, 2014

(51) Int. Cl.
*H04W 4/00* (2009.01)
*H04W 76/02* (2009.01)
*H04W 56/00* (2009.01)
*G06F 17/30* (2006.01)
*H04W 48/16* (2009.01)
*H04W 52/02* (2009.01)
*H04W 88/06* (2009.01)

(52) U.S. Cl.
CPC ....... *H04W 76/023* (2013.01); *G06F 17/30864* (2013.01); *H04W 48/16* (2013.01); *H04W 52/0219* (2013.01); *H04W 52/0258* (2013.01); *H04W 56/001* (2013.01); *H04W 52/0274* (2013.01); *H04W 88/06* (2013.01); *Y02B 60/50* (2013.01)

(58) Field of Classification Search
USPC .......... 370/311, 329, 336; 707/E17.108, 749, 707/769, 999.003, 999.006, 999.007
See application file for complete search history.

(56) References Cited

U.S. PATENT DOCUMENTS

| 6,490,446 | B1 | 12/2002 | Haartsen |
| 7,286,842 | B2 | 10/2007 | Li et al. |
| 7,818,340 | B1* | 10/2010 | Warren ................. G06Q 10/10 707/771 |
| 8,132,112 | B2* | 3/2012 | Li ....................... H04L 12/1818 709/204 |
| 8,491,384 | B2* | 7/2013 | Tran ................. H04N 21/25883 463/31 |
| 8,762,405 | B2* | 6/2014 | Qian ................. G06F 17/30702 707/769 |
| 2002/0132625 | A1* | 9/2002 | Ogino ....................... G01S 5/14 455/456.2 |
| 2003/0218632 | A1* | 11/2003 | Altwies ..................... G06F 3/14 715/740 |
| 2004/0083265 | A1* | 4/2004 | Beringer ...................... 709/204 |

(Continued)

FOREIGN PATENT DOCUMENTS

WO WO-2008020285 A2 2/2008

OTHER PUBLICATIONS

International Search Report and Written Opinion—PCT/US2013/068893—ISA/EPO—Mar. 25, 2014.

*Primary Examiner* — Phuongchau Ba Nguyen
(74) *Attorney, Agent, or Firm* — Kevin T. Cheatham; Charles E. Eggers

(57) ABSTRACT

This disclosure provides systems, methods and apparatus for wirelessly communicating with a wireless station. In one implementation, a mobile device comprises a memory unit configured to store communication information associated with communicating on at least one channel of a wireless network. The mobile device further comprises a processing system that is configured to establish communications with the wireless station via a communication link, retrieve the communication information from the memory unit, and to provide at least a portion of the communication information to the wireless station.

38 Claims, 16 Drawing Sheets

(56) References Cited

U.S. PATENT DOCUMENTS

| | | |
|---|---|---|
| 2006/0146731 A1 | 7/2006 | Lewis et al. |
| 2007/0287471 A1* | 12/2007 | Wood ................ H04L 63/08 455/456.1 |
| 2008/0020801 A1* | 1/2008 | Fesas ................ H04W 28/18 455/561 |
| 2008/0039037 A1* | 2/2008 | Kum .......................... 455/186.1 |
| 2008/0081675 A1 | 4/2008 | Pinder |
| 2009/0061862 A1 | 3/2009 | Alberth, Jr. et al. |
| 2009/0063990 A1* | 3/2009 | Morris ............ G06F 17/30864 715/751 |
| 2009/0103501 A1* | 4/2009 | Farrag ................ H04W 74/02 370/337 |
| 2009/0257379 A1* | 10/2009 | Robinson ............ H04W 16/14 370/329 |
| 2010/0105382 A1* | 4/2010 | Gallagher ..................... 455/434 |
| 2011/0134833 A1* | 6/2011 | Gogic ........................... 370/328 |
| 2011/0183669 A1 | 7/2011 | Kazmi |
| 2011/0256869 A1 | 10/2011 | Zhang et al. |
| 2012/0129537 A1* | 5/2012 | Liu et al. ....................... 455/444 |
| 2013/0194944 A1* | 8/2013 | Soyak et al. ................... 370/252 |
| 2013/0210481 A1* | 8/2013 | Sane ................... H04W 48/18 455/552.1 |
| 2013/0331031 A1* | 12/2013 | Palin et al. ..................... 455/41.2 |
| 2014/0095601 A1* | 4/2014 | Abuelsaad et al. ............ 709/204 |
| 2014/0148179 A1* | 5/2014 | Das et al. ................... 455/452.1 |
| 2014/0169244 A1* | 6/2014 | Polisetty et al. ............... 370/311 |
| 2014/0342756 A1* | 11/2014 | Houri ................... G01S 5/0252 455/456.2 |

* cited by examiner

1030

Data Structure of Shared Information

- Collaboration  1002
- Channel  1004
- Band  1006
- Sub-band  1008
- RAT  1010
- PSC  1012
- SSC  1014
- Cell ID  1016
- PLMN  1018
- Location Area  1020
- Position  1022
- Synchronization Timing  1024
- PN offset  1026

Figure 10

INCREASED POWER SAVINGS THROUGH COLLABORATIVE SEARCH

FIELD

The present application relates generally to communications, and more specifically to cell search techniques for locating cells in wireless communication systems.

BACKGROUND

Wireless communication systems are widely deployed to provide various types of communication content such as voice and data. Typical wireless communication systems may be multiple-access systems capable of supporting communications with multiple users by sharing available system resources (e.g., bandwidth, transmit power). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, such systems can conform to specifications such as those of third generation partnership project (3GPP), third generation partnership project 2 (3GPP2), 3GPP long-term evolution (LTE), LTE Advanced (LTE-A), etc.

Wireless communication systems, such as cellular communication systems, allow a user equipment (UE) to communicate wirelessly by establishing a wireless (e.g., radio) link between the user equipment and one of a number of available base stations (BS) or cells which are geographically distributed throughout a service area. User equipment, as used herein, is a broad term and can refer to a single device or multiple devices. Mobility is provided by means of protocols that enable the user equipment to be handed off from a first base station to a second base station as it moves from a coverage area of the first base station to another coverage area of the second base station. Various base stations may be connected (e.g., by means of wireless and/or wired links) to a public land mobile network (PLMN), which provides a necessary infrastructure for servicing calls. A PLMN typically has connections to public switched telephone networks (PSTNs) to enable calls to be routed to wire-line communication devices that are not associated with a PLMN.

Wideband code division multiple access (WCDMA) systems of 3GPP are wideband CDMA mobile communication systems operating over a 5 MHz channel with a channel raster of 200 KHz. There are multiple communication bands, such as International Mobile Telecommunications-2000 (IMT-2000) bands and Personal Communications Service (PCS) bands, supporting WCDMA systems and each spanning a 60 MHz bandwidth on downlinks.

Generally, wireless multiple-access communication systems may simultaneously support communications for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

When power is supplied to a user equipment, the user equipment performs a downlink synchronization of a base station and acquires a primary scrambling code (PSC) of the base station. Such a process is generally referred to as a cell search. The cell search is a procedure by which a user equipment acquires time and frequency synchronization with a base station and detects cell identities of the base station. In general, a cell search may be classified into an initial cell search, which is initially performed when a user equipment (UE) is powered on, or a target cell search which performs a handover or a neighbor cell measurement When the UE moves from cell to cell.

A user equipment consumes a relatively large amount of power consumption performing cell searches. When a user equipment starts a cell search procedure, it will identify at least a WCDMA channel, determine slot boundaries, determine frame boundaries, identify at least a PSC of a base station and finally identify a cell before starting communication with the base station. Because a user equipment may be powered on essentially anywhere and accuracy of a user equipment's oscillator can also vary, an initial cell search may involve searching for control channels of cells throughout an entire available radiofrequency band. For example, a base station search can identify one or more base stations having the best signal characteristics for communication with the user equipment, but this also can be a power consuming task. Accordingly, improved methods and devices for determining communication information for wireless mobile devices are desired.

SUMMARY

Various implementations of systems, methods and devices within the scope of the appended claims each have several implementations, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, implementations, and advantages will become apparent from the description, the drawings, and the claims. Note that the relative dimensions of the following figures may not be drawn to scale.

One implementation of the subject matter described in the disclosure provides a first mobile apparatus for wirelessly communicating with a second mobile apparatus. The first apparatus comprises a memory unit configured to store communication information associated with communicating on at least one channel of a wireless network. The first mobile apparatus further comprises a processing system that is configured to establish communications with the second mobile apparatus via a communication link, to retrieve the communication information from the memory unit, and to provide at least one portion of the communication information to the second mobile apparatus.

Another implementation of the subject matter described in the disclosure provides a method of wireless communications. The method, performed by a first user equipment, retrieving communication information associated with communicating on at least one channel of a wireless network. The method further comprises establishing communications with a second user equipment via a communication link. The method additionally comprises providing at least one portion of the communication information to the second user equipment via the established communication link.

Yet another implementation of the subject matter described in the disclosure provides a first mobile apparatus for wirelessly communicating with a second mobile apparatus. The first mobile apparatus comprises means for retrieving communication information associated with communicating on at least one channel of a wireless network. The first mobile apparatus further comprises means for establishing communications with the second mobile apparatus via a communication link. And the first mobile apparatus further comprises means for providing at least a portion of the information to the second user equipment via the communication link.

BRIEF DESCRIPTION OF THE DRAWINGS

FIG. 10 illustrates an example of a data structure of shared information used in a collaborative search.

DETAILED DESCRIPTION

Figure 1:
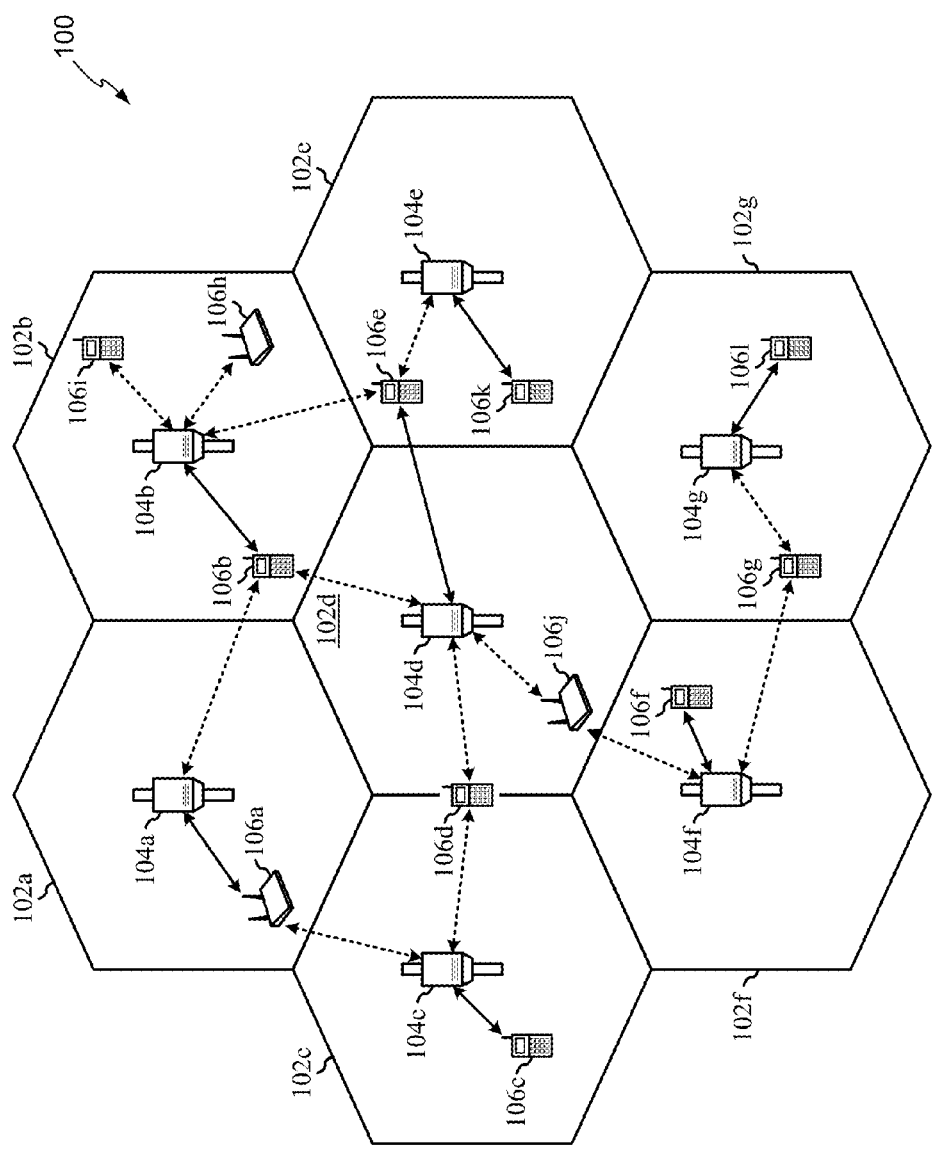
FIG. 1 illustrates an examples of a wireless communication network.

Various implementations of implementations within the scope of the appended claims are described below no single one of which is solely responsible for the desirable attributes described herein. It should be apparent that the implementations described herein may be implemented in a wide variety of forms and that any specific structure and/or function described herein is merely illustrative. Based on the present disclosure a person/one having ordinary skill in the art should appreciate that an implementation described herein may be implemented independently of any other implementations and that two or more of these implementations may be combined in various ways. For example, an apparatus may be implemented and/or a method may be practiced using any number of the implementations set forth herein. In addition, such an apparatus may be implemented and/or such a method may be practiced using other structure and/or functionality in addition to or other than one or more of the implementations set forth herein.

Details of one or more implementations of the subject matter described in this specification are set forth in the accompanying drawings and the description below. Other features, implementations, and advantages will become apparent from the description, the drawings, and the claims. Note that the relative dimensions of the following figures may not be drawn to scale.

The word "exemplary" is used herein to mean "serving as an example, instance, or illustration." Any implementation described herein as "exemplary" is not necessarily to be construed as preferred or advantageous over other implementations. The following description is presented to enable any person skilled in the art to make and use the invention. Details are set forth in the following description for purpose of explanation. In other instances, well known structures and processes are not elaborated in order not to obscure the description of the invention with unnecessary details. Thus, the disclosure is not intended to be limited by the implementations shown, but is to be accorded with the widest scope consistent with the principles and features disclosed herein.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM", etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2).

Single carrier frequency division multiple access (SC-FDMA), which utilizes single carrier modulation and frequency domain equalization is one technique used in a wireless communication system. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP LTE, or Evolved UTRA.

Furthermore, in the following description, for reasons of conciseness and clarity, terminology associated with the LTE Evolved Universal Terrestrial Radio Access (E-UTRA) systems may be used. The LTE E-UTRA technology is further described in the 3GPP TS 23.401: GPRS Enhancements for E-UTRAN Access (Release 8). It should be emphasized that the implementations disclosed herein may also be applicable to other technologies, such as technologies and the associated standards related to WCDMA, TDMA, OFDMA, Evolved High Rate Packet Data (eHRPD) and so forth. Terminologies associated with different technologies can vary. For example, depending on the technology considered, a user equipment used in LTE can sometimes be called a mobile station, a user terminal, a user equipment, an access terminal, etc., to name just a few. Likewise, the Serving Gateway (SGW) used in LTE can sometimes be called a gateway, a HRPD serving gateway, and so forth. Likewise, the evolved Node B (eNB) used in LTE can sometimes be called an access node, an access point, a base station, a Node B, HRPD base station (BTS), and so forth. It should be noted here that different terminologies apply to different technologies when applicable.

Furthermore, in the following description, for reasons of conciseness and clarity, terminology associated with the eHRPD systems is also used. Implementations associated with networking between E-UTRAN and eHRPD are further described in the 3GPP2 X.P0057: E-UTRAN-eHRPD Connectivity and Interworking: Core Network Aspects. It should be emphasized that the implementations described herein may also be applicable to other technologies as previously described.

FIG. 1 illustrates an exemplary wireless communication network 100. The wireless communication network 100 is configured to support communications between a number of users or user equipment. The wireless communication network 100 may be divided into one or more cells 102, such as, for example, cells 102*a*-102*g*. Communication coverage in cells 102*a*-102*g* may be provided by one or more nodes 104 (e.g., base stations 104), such as, for example, nodes 104*a*-104*g*. Each node 104 may provide communication coverage to a corresponding cell 102. The nodes 104 may interact with a plurality of access terminals (ATs) or user equipment, such as, for example, user equipment 106*a*-106*l*.

A user equipment 106 may be a wireless communication device (e.g., a mobile phone, router, personal computer, server, etc.) used by a user to send and receive voice or data over a communications network. A user equipment may also be referred to herein as an access terminal, as a mobile station (MS), or as a terminal device. As shown, the access terminals 106*a*, 106*h*, and 106*j* comprise routers. The user equipment 106*b*-106*g*, 106*i*, 106*k* and 106*l* comprise mobile phones. However, each of user equipment 106*a*-106*l* may comprise any suitable communication device.

Each user equipment 106 may communicate with one or more nodes 104 on a forward link (FL) and/or a reverse link (RL) at a given moment. A forward link is a communication link from a base station to a user equipment. A reverse link is a communication link from a user equipment to a base station. The forward link may also be referred to as the downlink. Further, the RL may also be referred to as the uplink. The base stations 104 may be interconnected, for example, by appropriate wired or wireless interfaces and may be able to communicate with each other. Accordingly, each user equipment 106 may communicate with another user equipment 106 through one or more base stations 104.

The wireless communication network 100 may provide service over a large geographic region. For example, the cells 102*a*-102*g* may cover only a few blocks within a neighborhood or several square miles in a rural environment. In one implementation, each cell may be further divided into one or more sectors that are not shown in FIG. 1.

As described above, a base station 104 may provide a user equipment 06 accesses within its coverage area to another communications network, such as, for example the internet or another cellular network.

Figure 2:
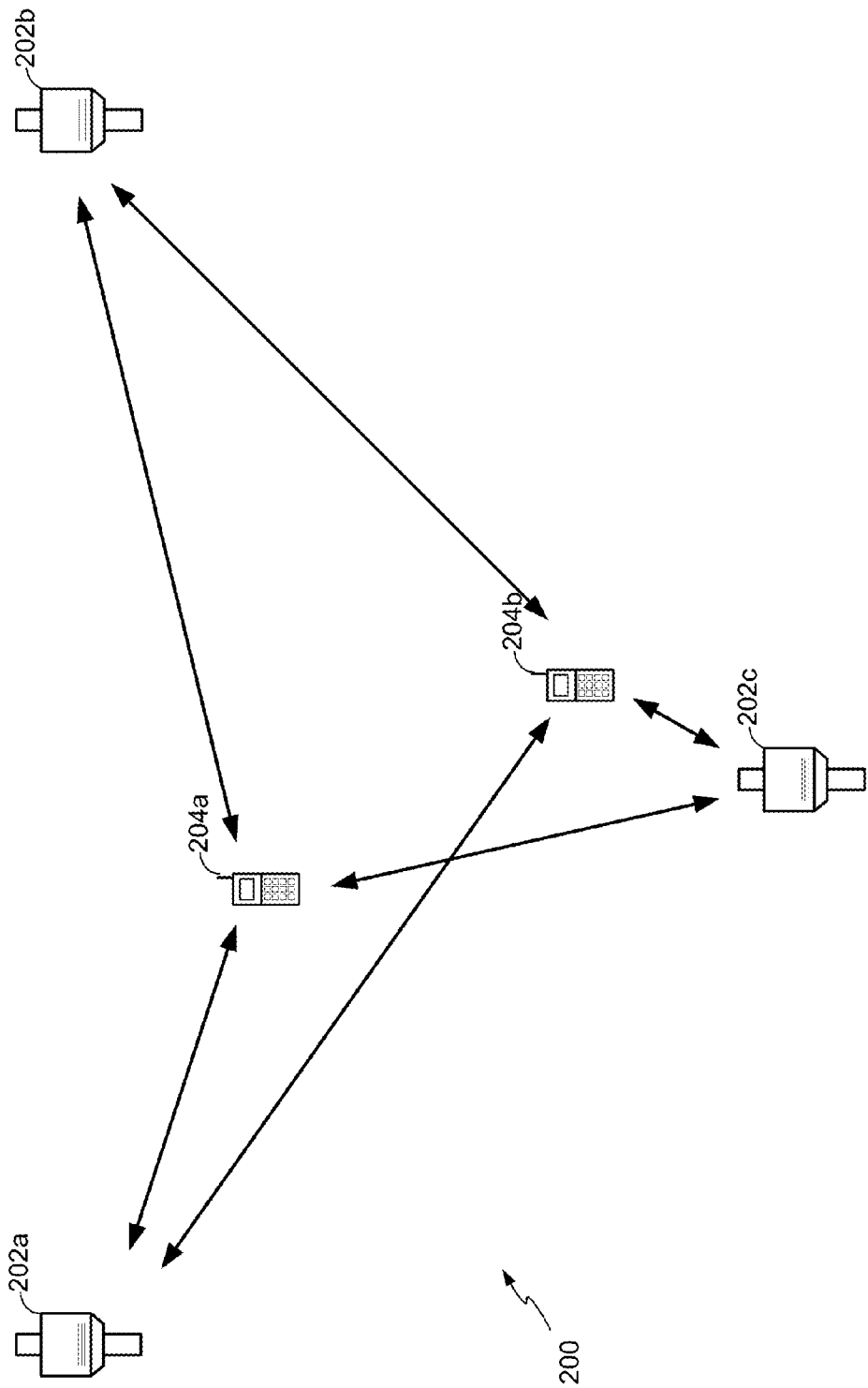
FIG. 2 is a general block diagram illustrating an example of a wireless communication system capable of supporting a number of user equipment.

FIG. 2 is another diagram of an exemplary wireless communication network 200 that supports at least two users. The system 200 may be designed to support one or more CDMA standards and/or designs (e.g., a WCDMA standard, a IS-95 standard, a cdma2000 standard, a HDR specification). For clarity, the system 200 is shown to include three base stations 202*a*, 202*b* and 202*c* in communication with two user equipment 204*a* and 204*b*. Although not shown in FIG. 2, the three base stations 202 may be interconnected and may be able to communicate with each other. Accordingly, each user equipment 204 may communicate with one another via one or more base stations 202.

In one implementation, there are no direct communication links between user equipment 204. When the user equipment 204*a* wants to communicate with the user equipment 204*b*, a communication between these two user equipment may go through at least one base station. For example, the user equipment 204*a* may synchronize with the base station 202*a* and register to the base station 202*a* at first. After the user equipment 204*a* registers with the base station 202*a* and becomes associated with the base station 202*a*, the user equipment 204*a* may exchange information with the base station 202*a*. The same procedure is applicable on the user equipment 204*b* and the base station 202*b*. After the user equipment 204*b* is associated with the base station 202*b*, the user equipment 204*a* may communicate with the user equipment 204*b* via the base stations 202*a* and 202*b*.

Depending on a wireless communication system being implemented, each user equipment 204 may communicate with one (or possibly more) base stations 202 on at least one forward link at any given moment, and may communicate with one or more base stations on at least reverse link depending on whether or not the user equipment is in soft handoff. As shown in FIG. 2, the user equipment 204*a* may simultaneously monitor forward links from both base stations 202*a* and 202*b*.

As a user equipment moves throughout a network, the user equipment may be required to perform a handoff from a part of the network using one radio access technology (RAT) to another part of the network using another RAT. For example, as shown in FIG. 2, a user equipment 204*a* may be configured to transition from a network using WCDMA radio access technology, for example, the base station 202*a*, to another part of the network using CDMA2000 radio access technology, for example, the base station 202*b*. A handoff may refer to a process of transferring an ongoing call or data session from one channel connected to a network to another. The term "handover" may also be used to refer to a handoff. When performing a handoff, the user equipment and the target network may exchange a variety of signaling and perform various operations in order to establish a new session and configure the traffic channel for sending and receiving data on the target network. Preferably, no interruption in service should occur during the handoff.

Figure 3:
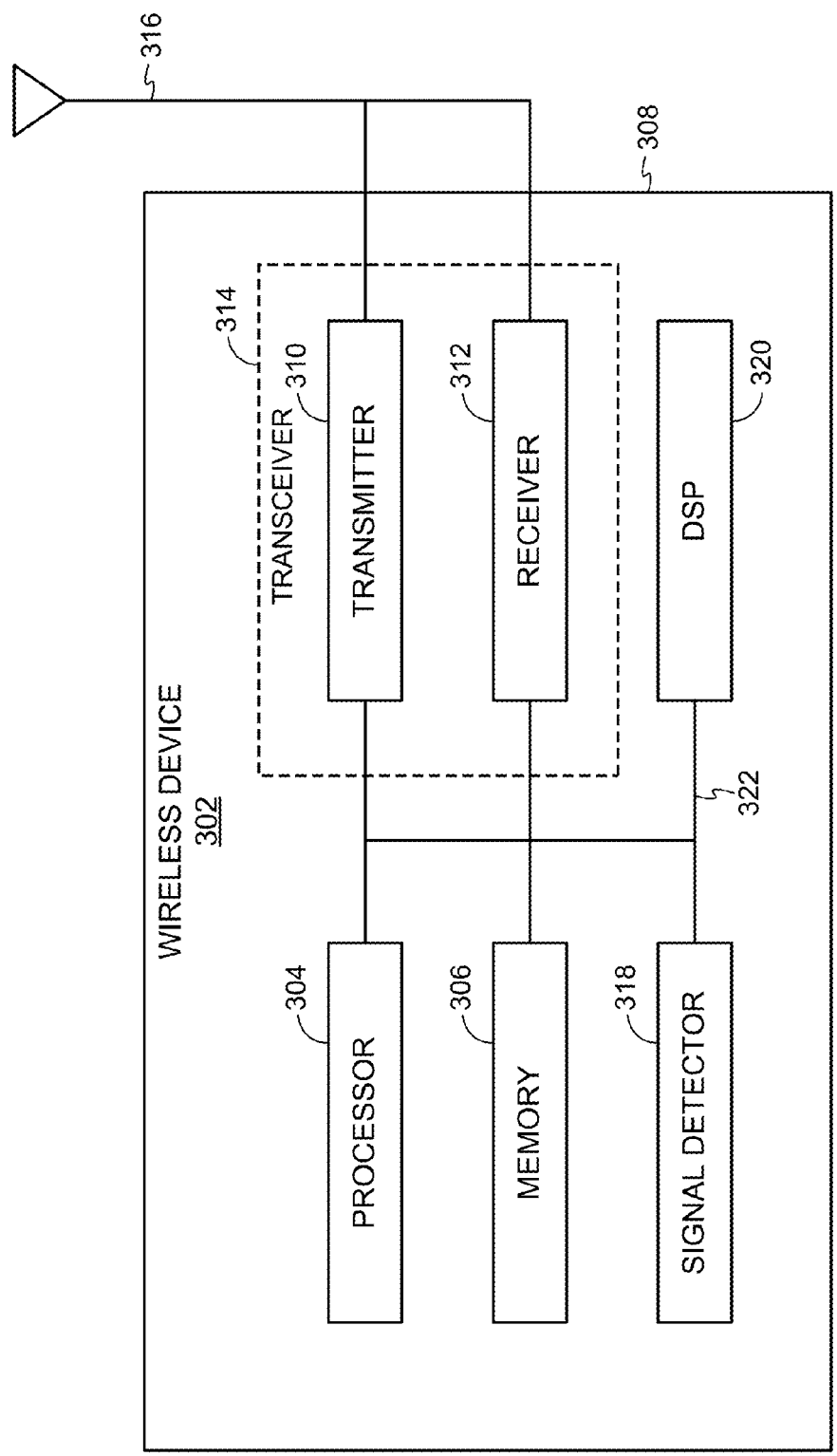
FIG. 3 shows a functional block diagram illustrating an example of user equipment.

FIG. 3 shows an example of a functional block diagram of an exemplary wireless device 302. The wireless device 302 may be single-mode and capable of operation using a single RAT such as WCDMA or CDMA2000. The wireless device 302 is an example of a device that may be configured to implement the various methods described herein. The wireless device 302 may implement any of the devices illustrated in FIGS. 1 and 2.

The wireless device 302 may include a processor 304 which controls operations of the wireless device 302. The processor 304 may also be referred to as a central processing unit (CPU). Memory 306, which may include both read-only memory (ROM) and random access memory (RAM), is coupled to the processor 304 (that is in communication with the processor 304) and provides instructions and data to the processor 304. A portion of the memory 306 may also include non-volatile random access memory (NVRAM). The processor 304 may perform logical and arithmetic operations based on program instructions stored within the memory 306. The instructions in the memory 306 may be executable to implement the methods and processes described herein.

The processor 304 may comprise or be a component of a processing system implemented with one or more processors. The processor 304 and the components of wireless device 302 the processor 304 is coupled to (for example, by a bus system 322) may be referred to as a processing system. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308, and may include a transmitter 310 and a receiver 312 to allow transmission and reception of data or instructions, for example wirelessly and/or over one of many known interfaces. The transmitter 310 and receiver 312 may be combined into a transceiver 314. In some implementations, a single or a plurality of transmit antennas may be attached to the housing 308 and electrically coupled to the transceiver 314. For example, when the wireless device 302 is used to implement a user equipment 106a, or a base station 104a of FIG. 1 or a base station 202 of FIG. 2, the wireless device 302 may comprise one or more antennas. The wireless device 302 may also include (not shown) multiple transmitters, multiple receivers, and/or multiple transceivers.

In some implementations, the wireless device 302 also includes a signal detector 318 that may be used in an effort to detect and quantify the level of signals received by the transceiver 314. The signal detector 318 may detect such signals as total energy, energy per subcarrier per symbol, power spectral density and other signals. In some implementation, the signal detector 318 may monitor and/or detect a signal quality parameter of a channel.

The wireless device 302 may also include a DSP 320 for use in processing signals.

The various components of the wireless device 302 may be coupled together by a bus system 322, which may include a power bus, a control signal bus, and a status signal bus in addition to a data bus. The wireless device 302 may further include other components or elements as will be understood by those having ordinary skill in the art.

Although described separately, it is to be appreciated that functional blocks described with respect to the wireless device 302 need not be separate structural elements. For example, the processor 304 and the memory 306 may be embodied on a single chip. The processor 304 may additionally, or in the alternative, contain memory, such as processor registers. Similarly, one or more of the functional blocks or portions of the functionality of various blocks may be embodied on a single chip. Alternatively, the functionality of a particular block may be implemented on two or more chips.

In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, units, blocks, and the like, such as shown and described in FIG. 3. One or more of the functional blocks and/or one or more combinations of the functional blocks described with respect to any user equipment 204 devices or components or other equipment described or illustrated herein may also be implemented as a combination of computing devices, e.g., a combination of a DSP and a microprocessor, a plurality of microprocessors, one or more microprocessor in conjunction with a DSP communication, or any other such configuration.

Figure 4:
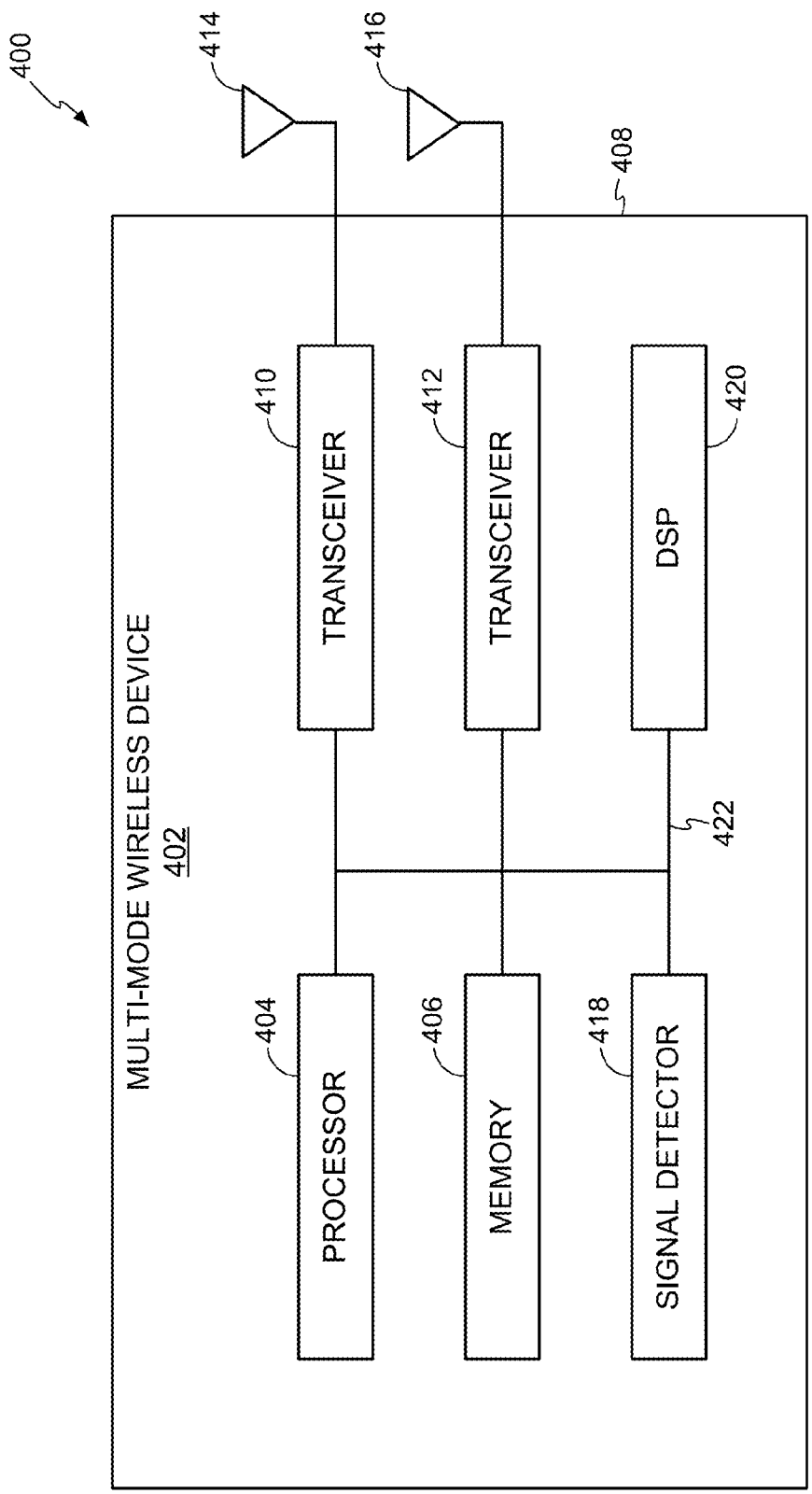
FIG. 4 shows a functional block diagram illustrating an example of a multi-mode user equipment.

FIG. 4 shows an example of a functional block diagram of an exemplary multi-mode wireless device 402, which is an implementation of any dual-mode or multi-mode user equipment shown in FIGS. 1 and 2. The wireless device 402 may be dual-mode and capable of operation using at least two different RATs, such as WCDMA, CDMA2000, Wi-Fi and/or Bluetooth. The wireless device 402 is an example of a device that may be configured to implement the various methods described herein. The wireless device 402 may include a processor 404 which controls the operation of the wireless device 402. The processor 404 may also be referred to as a CPU. Similar to the memory 306 of FIG. 3, memory 406 provides instructions and data to the processor 404. Similar to the processor 304 of FIG. 3, the processor 404 may comprise or be a component of a processing system implemented with one or more processors. The processor 404 may perform logical and arithmetic operations based on program instructions stored within the memory 406.

The wireless device 402 may also include a housing 408 that may include at least two transceivers 410 and 412 to allow transmission and reception of data or instructions, for example wirelessly and/or over more than one known interfaces. In some implementations, two or more transmit antennas 414 and 416 may be attached to the housing 408 and electrically coupled to the transceivers 410 and 412.

In some implementations, the wireless device 402 also includes at least one signal detector 418 that may be used in an effort to detect and quantify the level of signals received by the transceivers 410 and 412. The signal detector 418 may detect such signals as total energy, energy per subcarrier per symbol, power spectral density and other signals. The wireless device 402 may also include a digital signal processor (DSP) 420 for use in processing signals.

The various components of the wireless device 402 may be coupled together by a bus system 422, which may include a power bus, a control signal bus, and a status signal bus in addition to a data bus. The wireless device 402 may further include other components or elements as will be understood by those having ordinary skill in the art.

Although described separately, it is to be appreciated that functional blocks described with respect to the wireless device 402 need not be separate structural elements. For example, the processor 404 and the memory 406 may be embodied on a single chip. The processor 404 may additionally, or in the alternative, contain memory, such as processor registers. Similarly, one or more of the functional blocks or portions of the functionality of various blocks may be embodied on a single chip. Alternatively, the functionality of a particular block may be implemented on two or more chips.

Figure 5:
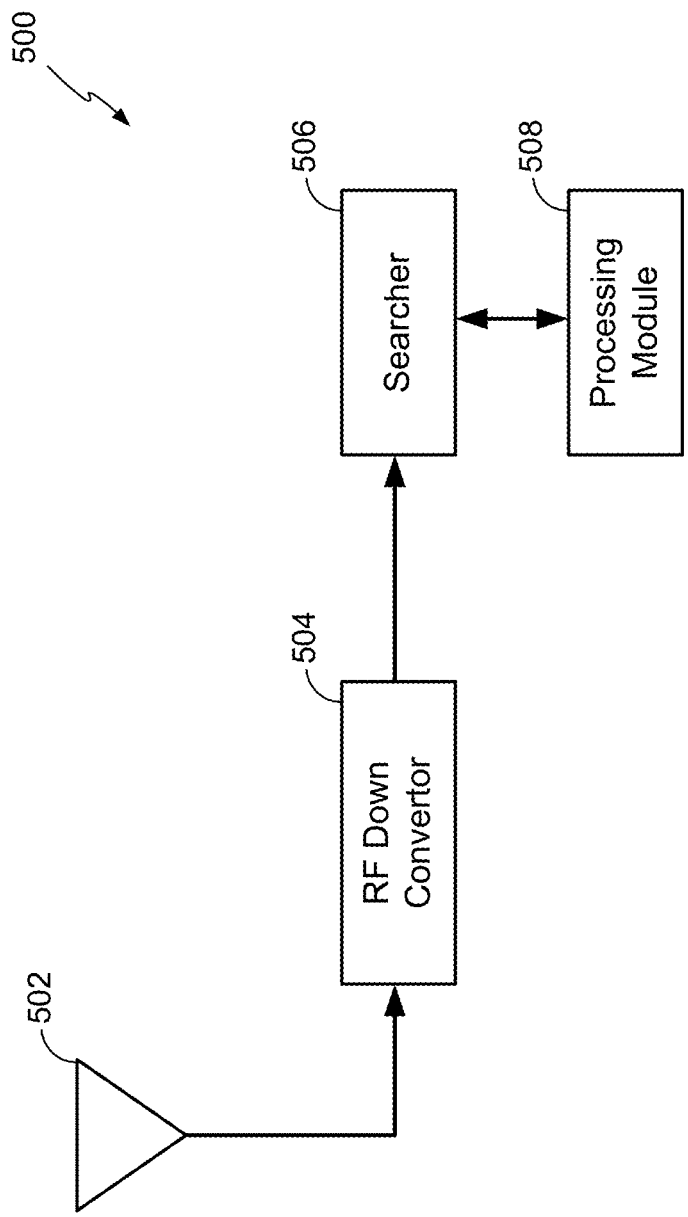
FIG. 5 depicts a functional block diagram illustrating an example of a search engine front end.

FIG. 5 depicts an exemplary implementation of any user equipment of FIGS. 1 and 2. For clarity, only a subset of components of a user equipment 106 or 204 are shown in FIG. 5. Signals are received at an antenna 502 and are delivered to a RF down-convert block 504 for amplification, down conversion and sampling. Various techniques for down-converting CDMA signals to a baseband are known in the art. From the RF down-convert block 504, I and Q samples are delivered to a searcher 506. Note that in alternative implementation, I and Q samples may be stored in a memory prior to delivery to the searcher 506. The searcher 506 is in communication with a processing module 508. Alternatives to employing a DSP include using another type of general purpose processors or specialized hardware designed to carry out various tasks related to searching that might be employed in the processing module 508. Depending on capabilities of the searcher 506, the processing module 508 may carry out various tasks described in the embodiments below, and coordinate performance of the remaining tasks in the searcher 506. While only one searcher 506 is shown in FIG. 5, any number of searchers may be implemented in parallel in accordance with principles of the present implement. Intermediate values may be computed at any point in the processes and apparatuses described below in the searcher 506 for delivery to the processing module 508 for subsequent processing. The processing module 508 may return processed intermediate values to the searcher 506 for subsequent processing as well. Various alternative configurations of a processing module or dedicated hardware will be clear to those of skill in the art and fall within the scope of the present invention.

Figure 6:
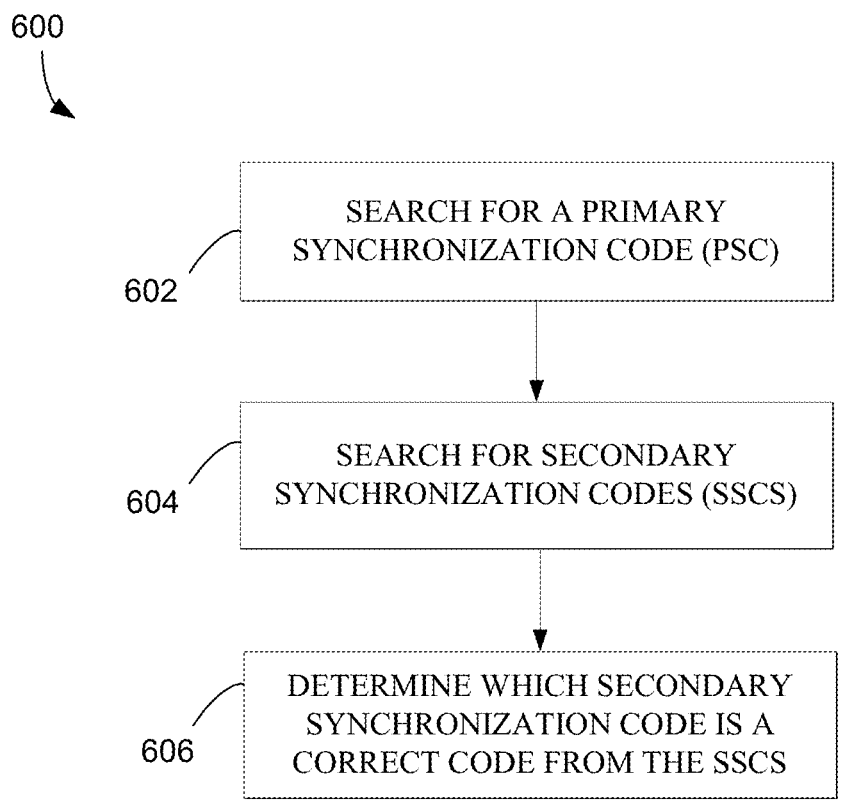
FIG. 6 depicts a flowchart illustrating an example of a search engine.

FIG. 6 depicts a flowchart illustrating one implementation of an operation of the search engine 508 of FIG. 5, which may be an implementation of any user equipment of FIGS. 1 and 2. WCDMA searching can be carried out using a three-step procedure. At block 602, the user equipment 106 searches for a primary synchronization code (PSC), a component of a primary synchronization channel. In some implementations, the PSC may be a fixed 256-chip sequence that is transmitted during the first 256 chips of each 2,560-chip slot. The PSC is the same for every cell in the system. The PSC is useful for detecting the presence of a base station, and once it is acquired, slot timing is also acquired.

At block 604, the user equipment 106 searches for secondary synchronization codes (SSCs), which make up secondary synchronization channels. There are 16 256-chip SSCs. Each base station transmits one SSC, along with the PSC, in the first 256 chips of every slot (each of the 16 SSCs and the PSC are orthogonal). There are 64 unique sequences of 15 SSCs, each sequence being associated with one of 64 scrambling code groups. Each base station 104 of FIG. 1 transmits one SSC sequence (15 SSCs per frame) corresponding to the code group containing that base station's scrambling code. The set of 64 SSC sequences are selected such that no sequence is equal to a cyclic shift of any of the other sequences or any non-trivial cyclic shift of itself. Because of this property, once a user equipment determines the sequence of SSCs transmitted in any 15 consecutive slots, it can determine both the frame timing and which of the 64 SSC sequences was transmitted, thus identifying the scrambling code group in which the base station belongs. Because there are eight codes in each scrambling code group, the number of candidates may be reduced to eight.

At block 606, the scrambling code candidates (for example, eight) identified in step two 604 may be searched to determine which one is a correct code by the user equipment 106. This can be carried out by performing a correlation, accumulating energies over some portion of the code candidates (a number of bits) until a decision can be made.

Figure 7:
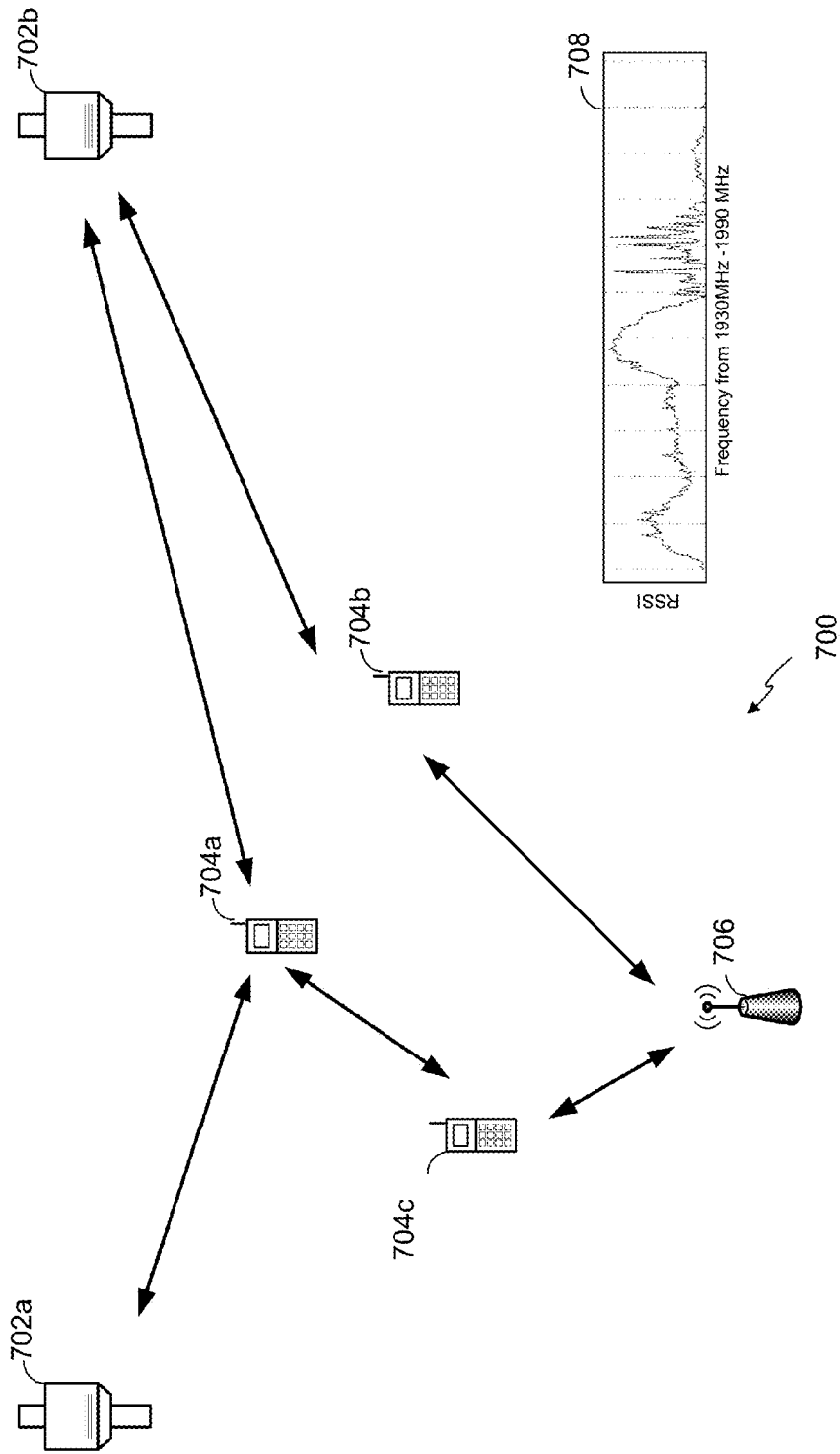
FIG. 7 is a block diagram illustrating an example of a wireless communication system capable of supporting a collaborative search.

FIG. 7 is a diagram of an implementation of a wireless communication system 700 that supports a collaborative cell search. The system 700 is designed to support one or more CDMA standards and/or designs (e.g., a WCDMA standard, a IS-95 standard, a CDMA2000 standard or a HDR specification) and at least one alternative communication technology, for example, Bluetooth or Wi-Fi. For clarity, the system 700 is shown to include two base stations 702a and 702b in communication with three user equipment 704a, 704b and 704c. In addition, the system 700 includes an access point 706 in communication with the two user equipment 704b and 704c. The user equipment 704b communicates with the base station 702b in addition to the access point 706. In one implementation, the user equipment 704a communicates directly with the user equipment 704c without via an access point or a bases station. For example, when the two user equipment 704a and 704c both support a peer-to-peer communication technology, such as Wi-Fi Direct (WFD) or Bluetooth, the user equipment 704a may exchange information directly with the user equipment 704c via a peer-to-peer connection.

In one implementation, the user equipment 704a determines what type of radio carrier or radio access technology (RAT) to search for before attempting to select a specific wireless network. Information transmitted from the base station 702a to the user equipment 704a enables the user equipment 704a to select a wireless network and this information may be stored in a suitable memory or memories in the user equipment 704a. The information may either be transmitted by the base station 702a on a suitable broadcast channel or selectively transmitted to the user equipment 704a, for example, during a registration of the user equipment 704a with a wireless network. The transmitted information that enables the user equipment 704a to select the wireless network includes, but is not necessarily limited to, a wireless network identification, for example, a public land mobile network (PLMN) identification (ID), which may be typically broadcast by each base station. Some user equipment may compare such transmitted PLMN IDs to PLMN IDs stored on the user equipment' memory (e.g., the memory 406 of FIG. 4).

The user equipment 704a may include one or more programmable processors or suitable logic, for example the processing module 508 of FIG. 5, that processes information stored in one or more memories. The stored information may include, among other things, information related to a RAT and/or frequency placement of previously found cells, which the processing module 508 uses in searching for cells and selecting PLMNs. It will be appreciated that the processing module 508 may include timers and other components that facilitate its operations. A transceiver circuitry (e.g., the transceiver 314 of FIG. 3 or the transceiver 414a or 414b of FIG. 4) provides for reception and transmission of control and traffic signals on links between the user equipment 704a and the base station 702a. At least one suitable transceiver circuitry is provided in the base station 702b. The transceiver may include frequency-selection components that operate under a control of a processor (e.g., the processor 304 of FIG.

3 or the processor 404 of FIG. 4) and determine a RAT used by the user equipment 704a to communicate with the base station 702a. The transceiver may produce down-converted and decoded information, e.g., frequency correction bursts and data symbols, which the processor can use to determine the current RAT and to handle information for different RATs.

In one implementation, a conventional PLMN selection or network selection procedure carried out by a user equipment (e.g., the user equipment 106 of FIG. 1 or the processor 304 of FIG. 3) involves scanning for available PLMNs, selecting the one highest prioritized available PLMN, and searching for cells and selecting a cell in the selected PLMN.

A cell search may include all frequency bands and RATs supported by a user equipment. For example, a PCS 1900 band and a WCDMA Band II are allocated the same uplink (1850-1910 MHz) and downlink (1930-1990 MHz) frequencies, and in some geographic areas, parts of these frequency bands are used for GSM systems and other parts for WCDMA systems. This is illustrated by a RSSI-frequency plot 708, which depicts an RSSI scan (in arbitrary units) in a frequency spectrum with a GSM or WCDMA system operating in. Because there are 300 possible frequency channels or absolute radio frequency channel number (ARFCNs) in a 60-MHz-wide, shared frequency band such as that illustrated by the RSSI-frequency plot 708, a user equipment (e.g., the user equipment 106 of FIG. 1) may spend significant time and energy on searching for non-existent cells, with clearly negative impact on both battery life time and user perceived experience.

In another implementation, for identifying a WCDMA channel, a user equipment (e.g., any user equipment 106 of FIG. 1) may perform a frequency scan over available WCDMA channels and calculate if any RSSI value is greater than a pre-defined threshold. In some implementations, this frequency scan step may take the user equipment about 500 ms in a scenario of an initial cell search when a fresh cold start is initiated on the user equipment. As described before, after the user equipment identifies a WCDMA channel with a satisfying RSSI value, it may start carrying out an additional three step search: (1) identifying slot timing, which may take the user equipment around 30 ms in some implementations, (2) identifying frame timing, which may take the user equipment additional 30 ms in some implementations, and (3) identifying a PSC of a cell operating on the identified WCDMA channel, which may approximately take the user equipment additional 5 ms in some implementations, before the user equipment finally identifies the cell and starts communication with it.

Information of a list of most frequently visited cells may be stored in a database of the user equipment. As such, next time upon power up, the user equipment may perform a three-step search as illustrated in FIG. 6 on at least some of the most frequently visited cells without a frequency scan at first. However, in some scenarios, a list of most frequently visited cells stored in a user equipment database may become outdated and unreliable. In some implementations, even though a user equipment performs a frequency scan on WCDMA channels of some ARFCNs and obtains good RSSI values, it may still fail to find an existing cell. As such, a full frequency scan, followed by a three step cell search, on available WCDMA channels may be necessary for the user equipment, and such cell search operations consume a lot of power.

To save user equipment search time and energy, in one implementation, a plurality of user equipment (e.g., any user equipment 106 of FIG. 1) are coordinated to scan different channels and/or bands. After scanning different channels and/or bands, the participating user equipment share their search results between them for saving search time and energy (for example, battery power of the UEs) through an alternative communication technology. In another implementation, the plurality of user equipment participating in a collaborative search are coordinated to each scan different bands and/or sub-bands, each of them including at least one channel. In some implementations, the user equipment participating in the collaborative search are coordinated to perform different searches based at least in part on the battery life (or power) of the user equipment. For example, with two user equipment participating in a collaborative search, the user equipment having the least amount of battery life left may be tasked to perform less searching than a user equipment with a greater amount of battery life remaining. In another example, if three or more user equipment are participating in a collaborative search, the amount of searching to be performed by each of the user equipment may be determined based on the relative battery power left in each user equipment so that the user equipment having the most battery power available performs an amount of searching that requires the most power. In some implementations, the battery power level of each user equipment participating in a collaborative search is a factor in determining which user equipment performs which search, but there are also other factors. In some implementations, one or more of the user equipment communicate with one or more other participating user equipment and share information that includes their battery power level. In some implementations, a single user equipment may coordinate (or decide) which of the participating user equipment participating in the collaborative search will perform certain portions of the collaborative search (for example, which bands and/or frequencies) based at least in part on the information including the user equipment battery life. In some implementations, the battery power (for example, some measure of the remaining battery power left, e.g., a percentage or other indicative information) of the user equipment is shared between the user equipment participating in the search and the user equipment each select a portion of the collaborative search to perform based on the battery life of one or more of the user equipment. For example, the decision as to what type of search a specific user equipment performs may be determined by a battery level of one or more user equipment and a common collaborative search scheme that may be used by all or a portion of the participating user equipment. The user equipment may make further communications to coordinate such collaborative searches. The user equipment that participate in the collaborative search may share their search results with the other participating user equipment. In some implementations, when a certain user equipment has completed a successful cell search, this user equipment may share search results with other user equipment to reduce their search time and energy in future cell searches.

Figure 8:
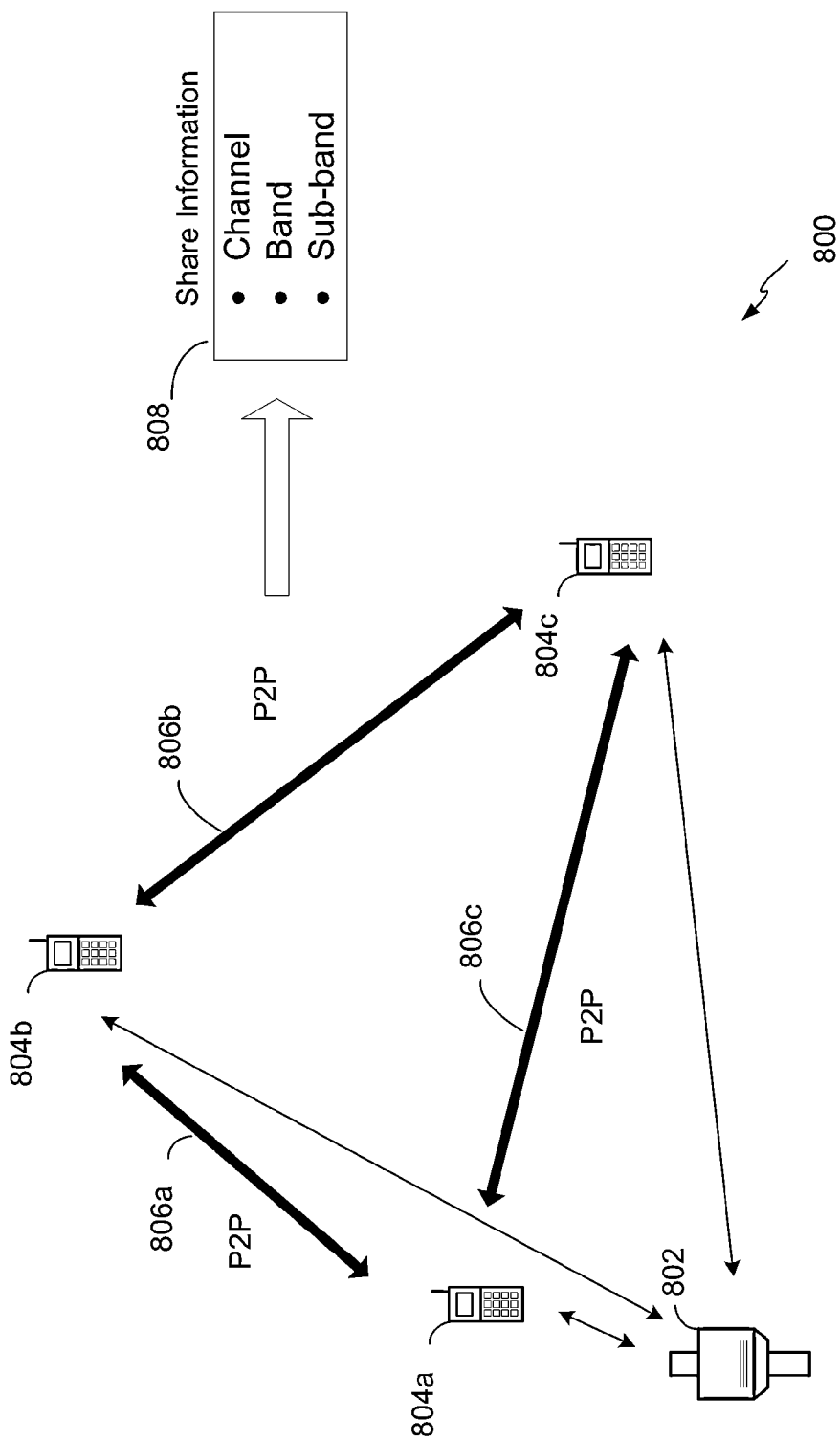
FIG. 8 is another block diagram illustrating an example of a wireless communication system capable of supporting a collaborative search.

FIG. 8 is a block diagram illustrating an example of a wireless communication system 800 that supports a collaborative cell search. The system 800 may be designed to support one or more CDMA standards and/or designs and an alternative communication technology, such as Bluetooth or Wi-Fi. For clarity, the system 800 is shown to only include a base station 802 and three user equipment 804a, 804b and 804c, which are near or in a coverage area of the base station 802 and start cell searches, respectively. In addition, the user equipment 804a communicates with the user equipment 804b via a peer-to-peer connection 806a and communicate with the user equipment 804c via a peer-to-peer connection 806c. The user equipment 804b may further communicate with the user equipment 804c through a peer-to-peer link 806c. The three peer-to-peer links 806a, 806b and 806c may be implemented using a peer-to-peer technology such as Bluetooth or WFD.

In one implementation, when the user equipment 804c moves into a coverage area of the base station 802 and starts an initial cell search, the user equipment 804c establishes a connection to at least one of the user equipment 804a or 804b via the peer-to-peer connection 806b and/or 806c. As noted before, there are 300 possible ARFCNs or universal ARFCNs (UARFCNs) in a 60-MHz-wide frequency bandwidth. A complete frequency scan on all possible channels may be very time and power consuming for the user equipment 804. Therefore, after at least one of the connection 806b or 806c is established, the user equipment 804c may negotiate with a connected equipment 804a and/or 804b to determine a mutual agreement for a frequency scan that each of the user equipment 804 will perform on different channels. In another implementation, at least one of the user equipment 804a or 804b shares known information with the user equipment 804c. Such shared information may include known RSSI values of previous scanned channels, PN positions, known cell IDs, known PLMN IDs and/or even the positions of known cells. A PN position or a PN offset identifies a position of a PN sequence with respect to time or chips.

In another implementation, as a result of the above mentioned negotiation, the user equipment 804c performs a frequency scan on a band, e.g., an IMT2000 band, while the user equipment 804b performs a frequency scan on a different band, e.g., a PCS band. In other words, each of the user equipment 804 can perform a scan on a different band, and then the results may be shared.

In yet another implementation, when user equipment 804 support a same frequency band, these user equipment 804 may divide the whole band into multiple sub-bands and each separately perform a frequency scan in each sub-band thereafter. After the user equipment 804 complete their frequency scans on the sub-bands, they share results of their frequency scans. Such share information may include, but not limited to, known RSSI values of previous scanned channels, PN position, known cell IDs, known PLMN IDs, location area and/or even the positions of known cells.

In some implementations, shared search results include information of a list of channels that any user equipment 804 has found to have good RSSI values. A RSSI-and-channel relationship is illustrated in the RSSI-frequency plot 708 of FIG. 7.

Figure 9:
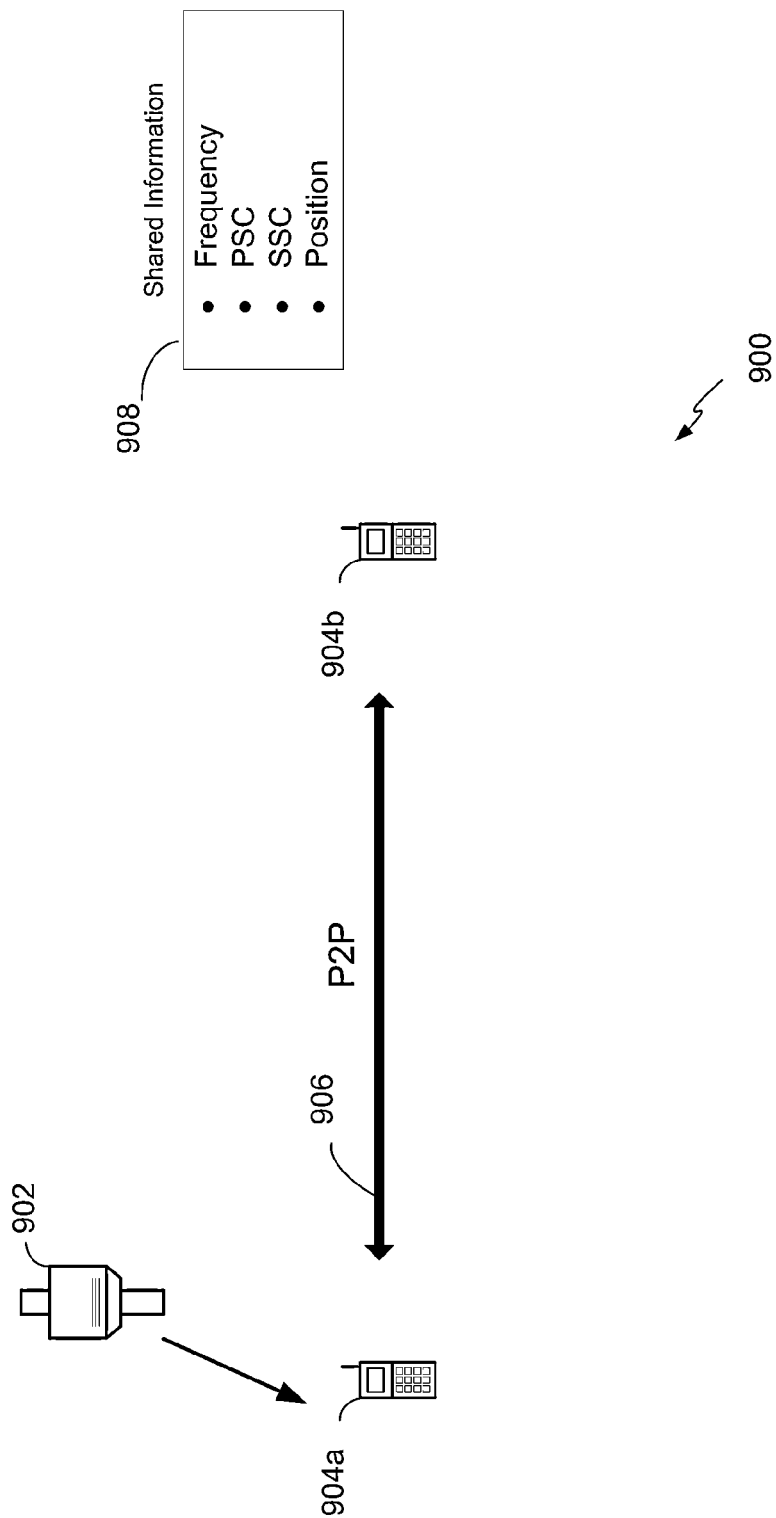
FIG. 9 is another block diagram illustrating an example of a wireless communication system capable of supporting a collaborative cell search with a camped user equipment.

FIG. 9 is a diagram illustrating an example of a wireless communication system 900 that supports a collaborative search supporting a camped user equipment. The system 900 may be designed to support one or more CDMA standards and/or designs and an alternative communication technology, such as Bluetooth or Wi-Fi. For clarity, the system 900 is shown to include a base station 902 and two user equipment 904a and 904b, which are in communication with, or in a coverage are of, the base station 902. In addition, the user equipment 804a communicates with the user equipment 804b through a peer-to-peer connection 906. In some implementations, the peer-to-peer connection 906 may be implemented using a P2P technology such as Bluetooth or WFD.

In one implementation, when the user equipment 904a successfully completed a cell search and is able to camp on a coverage of the base station 902, the user equipment 904a shares frequency, PSC, PN position (or PN offset) and/or position information of the base station 902 with the other user equipment 904b. As such, the user equipment 904b may only need to perform a reduced cell search around the base station 902. In another implementation, the user equipment 904b tunes to the frequency shared by the user equipment 904a, uses the code shared by the user equipment 904a and starts dispreading/descrambling at the PN position shared by the user equipment 904a.

FIG. 10 illustrates an example of a data structure 1030 of information that may be shared in a collaborative search. This data structure 1030 is an exemplary implementation of the shared information 808 of FIG. 8 and the shared information 908 of FIG. 9. In some implementation, the data structure 1030 is provided in response to a peer-to-peer assistance request from a user equipment (e.g., the user equipment 804 of FIG. 8 or the user equipment 904 of FIG. 9). The data structure 1030 may further include additional configuration information not shown in FIG. 10, such as a preamble, and/or a data structure header. For example, a header can include a timestamp of the transmission, a source address, a destination address and/or a sequence number. The data structure 1030 may further include other components or elements as will be understood by a person of ordinary skill in the art.

In the example illustrated in FIG. 10, the data structure 1030 includes a collaboration field 1002, the collaboration field specifying an action or application of information included in the data structure 1030, such as indicating that a message is a request message or a response message. For example, when the collaboration field 1002 is set to be "1," it means that the information included in an implementation of the data structure 1030 is to be shared between participating user equipment (e.g., the user equipment 806a, 806b and 806c of FIG. 8). In this case, an information source address field may be included to indicate which user equipment this shared information originated from. In another implementation, when the collaboration field 1002 is set to be "2", it indicates that the implementation of the data structure 1030 is a collaborative search request received from a user equipment (e.g., the user equipment 904b of FIG. 9).

A subset of the data structure 1030 includes a channel field 1004, a band field 1006 and a sub-band field 1008, which may be used to specify which frequency band and/or channel the data structure 1030 corresponding to. For example, the band field 1006 may indicate that the user equipment 904a operates in a frequency band of 2100 megahertz (MHz), which can indicate, for example, that a transmit frequency range of the user equipment 904a is between 1920 and 1980 MHz, and a user equipment receive frequency range is between 2110 and 2170 MHz. The channel field 1004 may be used to specify an operating frequency being used by the user equipment 904a and it may include information on a channel number corresponding to the operating frequency. The channel number may be a universal mobile telephony system terrestrial radio access absolute radio frequency channel number (UARFCN), for example, between channel 9612 and 9888.

A RAT field 1010 may be used to specify a RAT identifier that describes which radio access technology is used by a user equipment (e.g., the user equipment 904a of FIG. 9) and/or a base station (e.g., the base station 902 of FIG. 9). A PSC field 1012, a SSC field 1014 and/or a cell ID field 1016 may be used by a user equipment to specify a base station in communication with. For example, the PSC field 1012 specifies a primary scrambling code used by the base station 902, the SSC field 1014 specifies a secondary scrambling code used by the base 902, and the Cell ID field 1016 includes a cell identifier of the base station 902.

A PLMN field 1018 can be used to specify a mobile country code (MCC) and/or a mobile network code (MNC), which, in combination, may uniquely identify a network operator. In some implementations, the data structure 1030 may allow data of the PLMN field 1018 to include only MCC information or only MNC information, such that a MCC and a MNC can be transmitted separately. Thus, a user equipment may provide collaborative search assistance to other user equipment without revealing what a network operator is used by the user equipment.

The data structure 1030 can further include a location area field 1020, which may be used to specify a location area code (LAC), and/or a position field 1022, which may be used to specify a geographic location, e.g., coordinates, of the base station 902. As such, a user equipment may provide its own position for a collaborative search request or indicate shared information of the data structure 1030 is valid for a certain location.

Furthermore, the data structure 1030 may include a synchronization timing field 1024 and/or a PN position field 1026. The synchronization timing field 1024 may be used by a user equipment (e.g., the user equipment 904a of FIG. 9) to synchronize with a particular base station (e.g., the base station 902 of FIG. 9). For example, the synchronization timing field 1024 may include slot timing and/or frame timing of the base station 902 operating on a channel identified by the channel field 1016. The PN position field 1026 may include a start position of a pseudo noise sequence (PSC) of a base station in time with reference to some global time reference. In one implementation, a base station transmits a pilot sequence periodically encoded by a pseudo noise sequence. Each user equipment may try to acquire a start position of this pseudo noise sequence in time. Once the user equipment knows the PSC and the start position, the user equipment may do a dispreading and/or descrambling with this pseudo noise sequence. This implementation may also be applied to other communication systems or standards, such as LTE. Not all information needs to be provided for all data fields during a peer-to-peer assistance of a collaborative search. For example, the user equipment 804c that receives partial information from multiple user equipment 84a and 804b may assemble the partial information together for a collaborative search. In another implementation, there is a search assistance server that collects partial information from multiple user equipment and assembles the collected partial information together. As such, when another user equipment requests information for a collaborative search, this user equipment may be able to obtain a relatively complete information.

Figure 11:
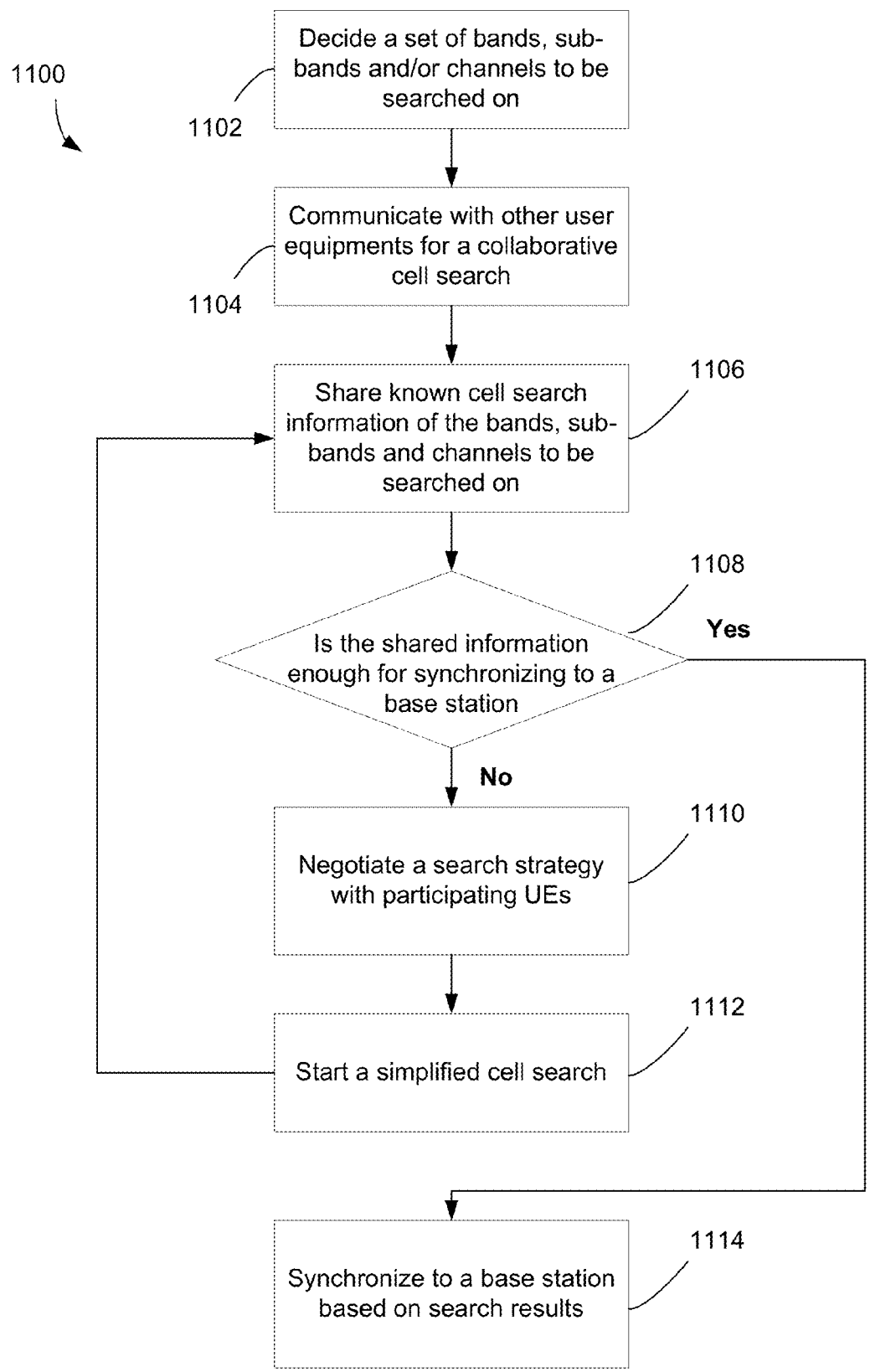
FIG. 11 illustrates a flowchart of an example of a method of a collaborative cell search.

FIG. 11 shows a flowchart of an exemplary method 1100 of a wireless communication for a collaborative search by a user equipment (e.g., the user equipment 804a of FIG. 8 or the user equipment 904b of FIG. 9). To begin the collaborative cell search, the user equipment determines a set of bands, sub-bands and/or channels to be search on (block 1102). In one implementation, information of the set of bands, sub-bands and/or channels is stored in a memory (e.g., the memory 406 of FIG. 4) or previously downloaded to the user equipment by a manufacture, a user or an operator. After block 1102, the user equipment starts communicating with other user equipment that may be available for the collaborative cell search (block 1104). In one implementation, the user equipment broadcasts its collaborative search request through a peer-to-peer network (e.g., via a Bluetooth link) or a local area network (LAN) (e.g., an IEEE 802.11 LAN). In block 1106, participating user equipment share known information with each other related to the set of bands, sub-bands and/or channels to be searched on. In one implementation, the user equipment collects related information from each of the participating user equipment and assembles the information together for its use. Following block 1106, the user equipment determines if the user equipment has information enough for it to synchronize to a base station in decision block 1108. If the user equipment finds that it has collected information enough for it to skip a cell search ("Yes" path out of decision block 1108), at block 1114 the user equipment may start synchronizing to a base station which the user equipment thinks to be top of its base station search candidate list based on the information known to the user equipment.

If the user equipment finds that it may lack some necessary information ("No" path out of decision block 1108), the user equipment may proceed to block 1110 and start negotiating a collaborative search strategy with participating user equipment. In block 1110, each participating user equipment may jointly decide which subset of the bands, sub-bands and/or channels to be searched on by each participating user equipment based on a known negotiation policy. Each participating user equipment may also decide which cell search step(s) has been done on each channel of the set and which cell search step(s) need be done. Following the negotiation in block 1110, each participating user equipment may start a simplified cell search based on the information obtained in block 1106. During and/or after the simplified cell search performed by each participating user equipment, each of the user equipment may also share cell search information they newly find with each other as in block 1106.

Figure 12:
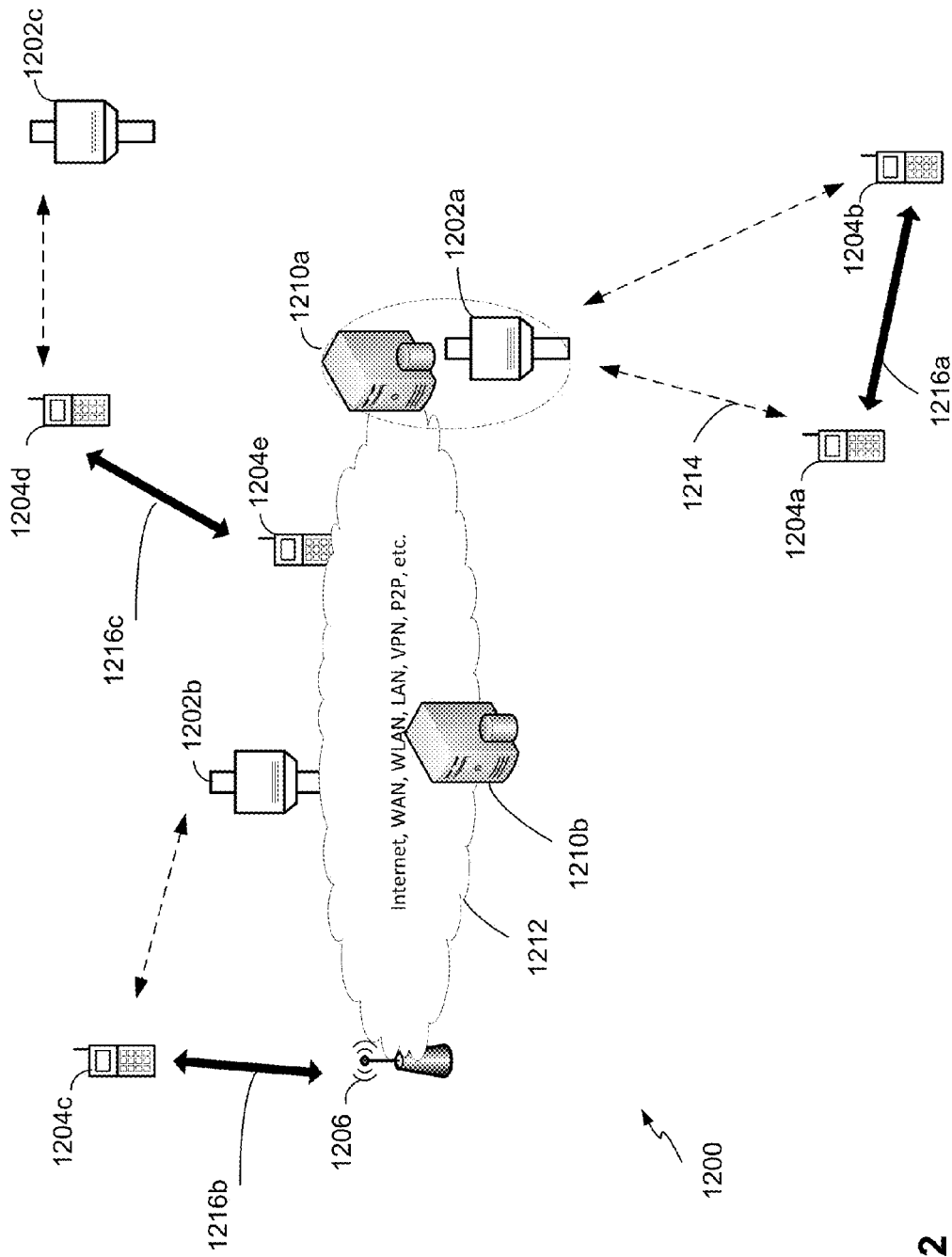
FIG. 12 illustrates a block diagram of an example of a wireless communication system capable of supporting a collaborative cell search via a collaborative cell search assistance server.

FIG. 12 illustrates a block diagram of an example of a wireless communication system 1200 capable of supporting collaborative cell searches via collaborative cell search assistance servers 1210a and 1210b. The system 1200 may be implemented to support one or more CDMA, UMTS or LTE standards and/or designs and/or an alternative communication technology, such as Bluetooth or Wi-Fi. For clarity, the system 1200 is shown to include three base stations 1202a, 1202b and 1202c, five user equipment 1204a, 1204b, 1204c, 1204d and 1204e, one access point 1206 and two search assistance server 1210a and 1210b. The two search assistance server 1210a and 1210b, the access point 1206, the base station 1202b and the user equipment 1204e are connected to each other via a communication interconnection 1212, which may be at least one of an internet interconnection, a WAN interconnection, a WLAN, interconnection, a LAN interconnection, a VPN interconnection, a P2P interconnection, or etc. As such, various collaborative search capable user equipment may do collaborative searches for base stations with sharing information together via various communication interconnections with at least one search assistance server (e.g., the search assistance servers 1210a and 1210b).

In FIG. 12, the user equipment 1202a is shown to have already been in connection to the base station 1202a via a wireless connection 1214. In one implementation, the user equipment 1202a has registered to the base station 1202a and camps in a coverage area of the base station 1202a. In some implementations, the user equipment 1202a may be in at least one of a connection mode, an active mode, a sleep mode, an inactive mode, or a dormant mode in communicating with the base station 1202a. Also shown in FIG. 12, the user equipment 1204b is searching for a base station, for example, the base station 1202a. At least to reduce a burden of a cell search, the user equipment 1204b starts a collaborative search with the user equipment 1204a via a peer-to-peer connection 1216a. An exemplary collaborative search assistance request may include an implementation of at least one subset of the data structure 1030 of FIG. 10. As such, the user equipment 1204a may share information regarding neighbor base stations, including the base station 1202a, with the user equipment 1204b via the peer-to-peer connection 1216a. In one implementation, the base station 1202a has a connection to the search assistance server 1210a. This connection may be at least one of a direct communication link or a part of an Internet interconnection. In another implementation, the base station 1202*a* and the search assistance server 1210*a* are coupled to each other. For example, the search assistance sever 1210*a* may be a part of or a function of the base station 1202*a*. As such, the user equipment 1202*a* may forward a collaborative search assistance request from the user equipment 1204*b* to the search assistance server 1210*a* via the base station 1202*a*. The search assistance server 1210*a* may reply to the collaborative search assistance request by sending information back to the user equipment 1204*b*. In another implementation, the search assistance server 1210*a* coordinates a collaborative search between the user equipment 1204*b* and other participating user equipment, which are not shown in FIG. 12.

Still referring to FIG. 12, in some implementations the user equipment 1204*c* is in a neighborhood of the base station 1202*b* and starts a collaborative cell search. Because the user equipment 1204*c* has an additional RAT transceiver module (e.g., the transceiver 410 or 412 of FIG. 4), the user equipment 1204*c* may start a RAT connection to the access point 1206 via connection 1216*b*. The 1216*b* connection may be a WLAN Wi-Fi connection or a peer-to-peer connection. On the other side, the access point 1206 has one connection to at least one of the search assistance servers 1210*a* and 1210*b* via the interconnection 1212. Therefore, the user equipment 1204*c* may send a collaborative search assistance request to one of the search assistance servers 1210*a* and 1210*b* via the access point 1206. An exemplary collaborative search assistance request may include an implementation of at least one subset of the data structure 1030 of FIG. 10. A communication address of a requested search assistance server may be previously downloaded or input to the user equipment 1204*c* by a network operator or a user. Accordingly, one of the search assistance servers 1210*a* and 1210*b* may reply to the search assistance request with information of neighbor base stations around the user equipment 1204*c*.

It is also shown in FIG. 12 that the user equipment 1202*d* is in a neighborhood of the base station 1202*c* and may start a collaborative cell search. Additionally, the user equipment 1202*d* may communicate with the user equipment 1204*e* via a connection 1216*c* (e.g., a Bluetooth connection or a Wi-Fi direct connection), and the user equipment 1202*e* may has one connection to at least one of the search assistance servers 1210*a* and 1210*b*. In one implementation, the user equipment 1204*e* has some information of neighbor base stations around user equipment 1202*d*. This information may come from results of previous collaborative cell searches or non-collaborative cell searches performed by the user equipment 1204*e*. If the user equipment 1204*e* thinks this information may be useful to the user equipment 1204*d*, it may forward this information to the user equipment directly via the connection 1216*c*. In another implementation, the user equipment 1204*e* may forward a collaborative search assistance request from the user equipment 1204*d* to one of the search assistance servers 1210*a* and 1210*b* via the interconnection 1212. An exemplary collaborative search assistance request may include an implementation of at least one subset of the data structure 1030 of FIG. 10. Accordingly, the at least one of the search assistance servers 1210*a* and 1210*b* may reply the collaborative search assistance request with information related to the neighbor base stations to the user equipment 1204*d*. In another implementation, the at least one of the search assistance servers 1210*a* and 1210*b* coordinate a collaborative search between the user equipment 1204*d* and other participating user equipment, which are not shown in FIG. 12.

Figure 13:
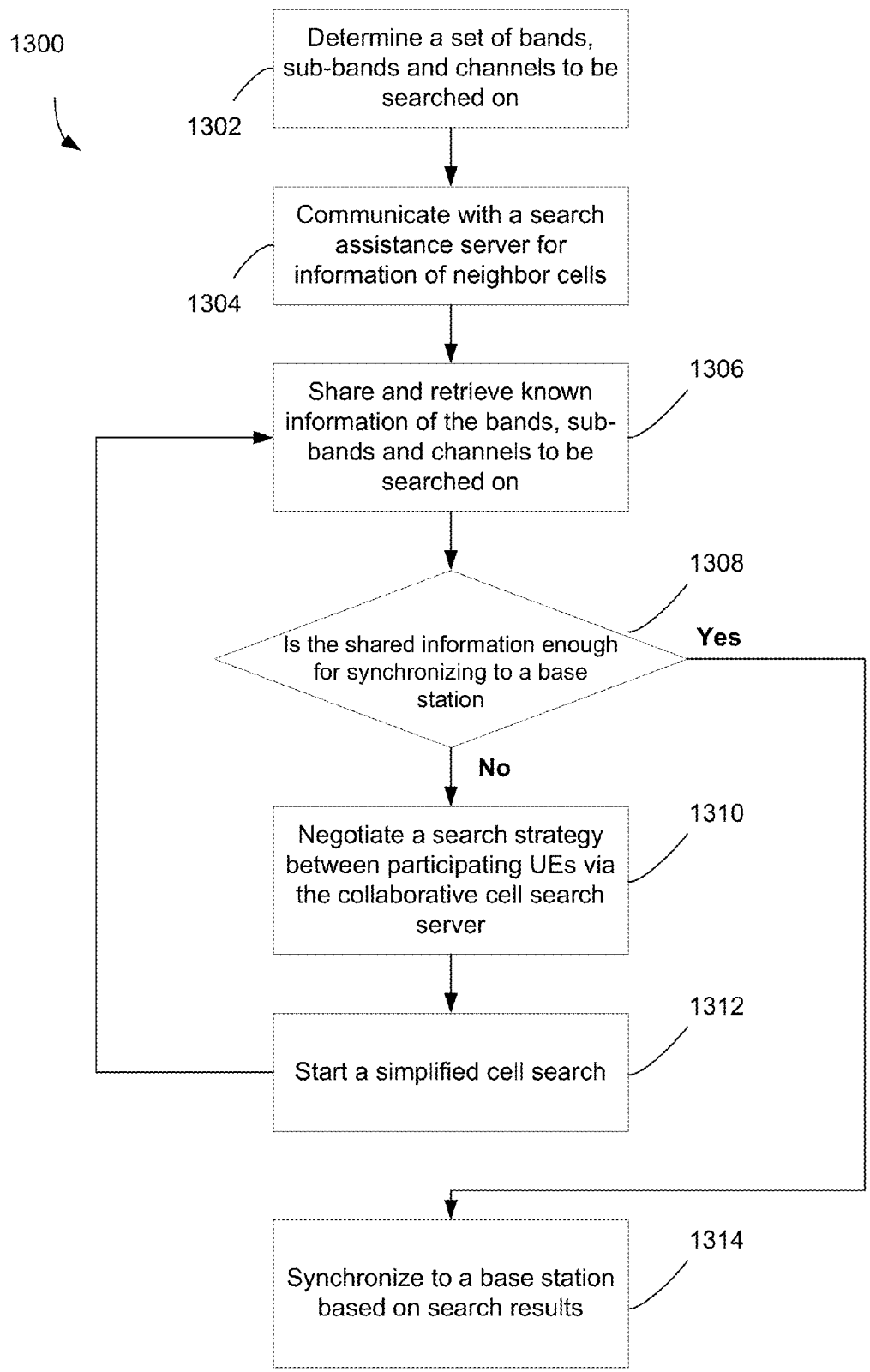
FIG. 13 illustrates a flowchart of an example of a method of a collaborative cell search via a collaborative cell search assistance server.

FIG. 13 illustrates a flowchart of another example of a method 1300 of wireless communications for a collaborative search by a user equipment (e.g., the user equipment 804*b*, a of FIG. 8, the user equipment 904*b* of FIG. 9, or any of the user equipment 1204*b*, 1204*c* and 1204*d* of FIG. 12) using a search assistance server (e.g., the search assistance server 1210*a* or 1210*b* of FIG. 12). To begin the collaborative cell search, the user equipment need decide a set of bands, sub-bands and/or channels to be search on (block 1302). In one implementation, information of the set of bands, sub-bands and/or channels to be searched on is stored in a memory (e.g., the memory 406 of FIG. 4) or previously downloaded to the user equipment by a manufacture, a user or an operator. After block 1302, the user equipment starts communicating with a search assistance server for information of its neighbor cells (block 1304). In one implementation, the user equipment connects to the search assistance server via an alternative communication technology, such as a LAN, Wi-Fi LAN or a wide-area network (WAN). In block 1306, the user equipment may retrieve information related to the set of bands, sub-bands and/or channels from the search assistance server. Meanwhile, the user equipment has some information related to a cell search and it may also share it with the search assistance server. In one implementation, the search assistance server collects information related to cell searches from all participating user equipment and assembles the information into a database. Following block 1306, the user equipment decides if the user equipment has information enough for it to synchronize to a base station in decision block 1308. If the user equipment finds that it has collected information enough for it to skip a cell search ("Yes" path out of decision block 1308), the user equipment may start synchronizing to a base station which the user equipment thinks to be top of its base station search candidate list based on the information known to the user equipment.

If the user equipment finds that it may lack some necessary information ("No" path out of decision block 1308), the user equipment may proceed to block 1310 and start negotiating a collaborative search strategy with participating user equipment. In one implementation, this collaborative search strategy negotiation is done by the search assistance server with each participating user equipment. In block 1310, each participating user equipment knows which subset of the bands, sub-bands and/or channels to be searched on from results of the negotiation. Each participating user equipment may also decide which cell search step(s) has been done on each channel of the set and which cell search step(s) need be done. Following the negotiation in block 1310, each participating user equipment may start a simplified cell search based on the information obtained in block 1312. During and/or after the simplified cell search performed by each participating user equipment, each participation user equipment may also share cell search information they newly find with each other as in block 1306.

Figure 14:
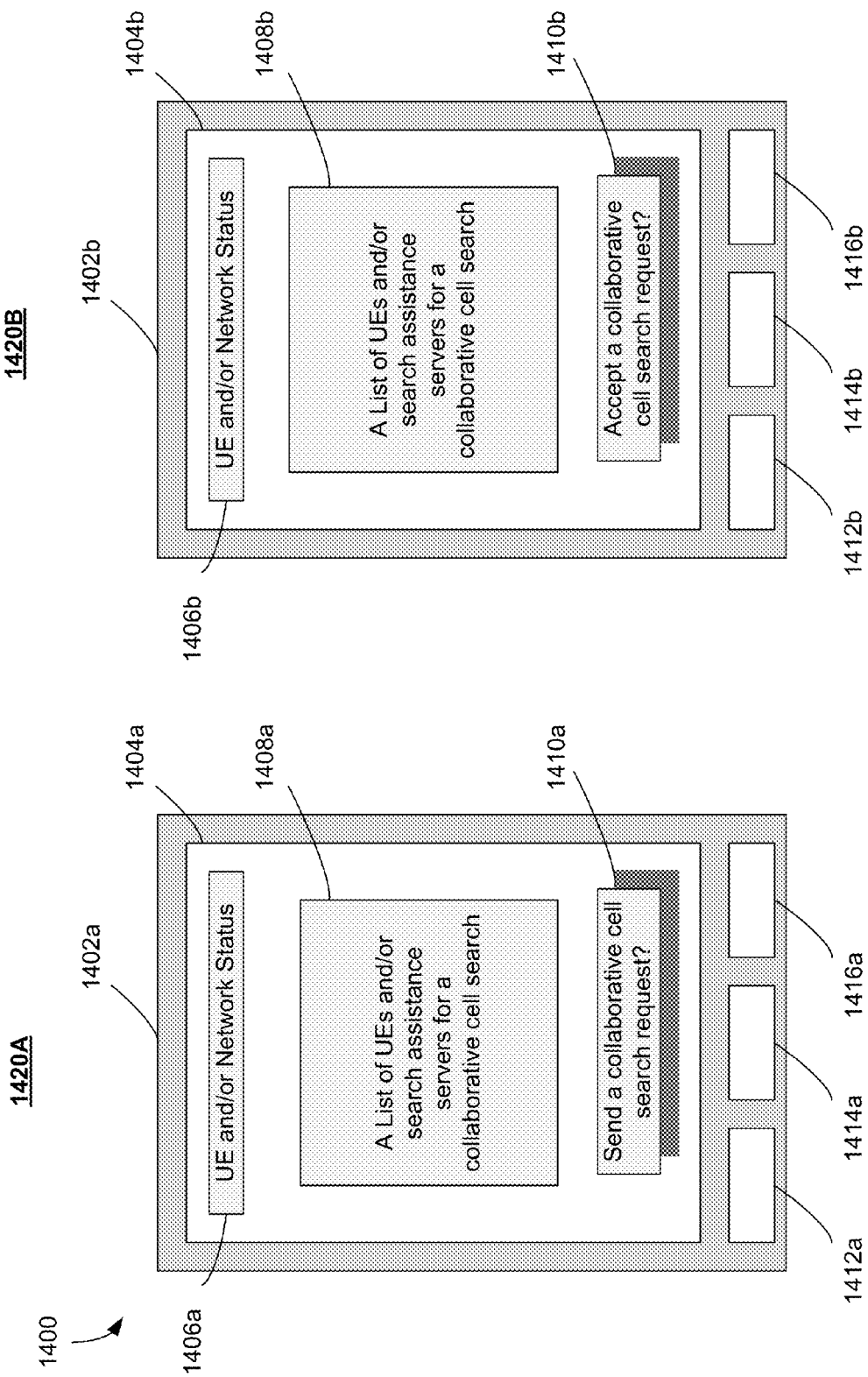
FIG. 14 illustrates a block diagram of an example of a user interface of a user equipment for a collaborative cell search.

FIG. 14 illustrates a block diagram of an example of a user interface 1400 of a user equipment (e.g., any user equipment 106 of FIG. 1) supporting a collaborative cell search. FIG. 14 illustrates two examples, user interface implementations 1420A and 1420B, of the user interface 1400. The user interface implementation 1420A has a large surface 1402*a*, one main view area 1404*a* and three possible buttons 1412*a*, 1414*a* and 1416*a*. In the main view area 1404*a*, there are three main components: a status bar 1406*a*, an information window 1408*a* and a confirmation button 1410*a*. The status bar 1406*a* displays a current status of the user equipment, such as a power status, a status of a connected network, a status of the user equipment's communication interface(s). The information window 1408*a* displays a list user equipment(s) and/or search assistance server(s) available for the user equipment to start a collaborative search. In some implementation, each participating user equipment or each search assistance server on the list can be highlighted for indicated a choice by a user. The confirmation button 1410*a* is used to confirm the choice by the user. After the user confirms the selection, the user equipment may send a collaborative search request to a user equipment or a search assistance server highlighted on the information window 1408*a*.

Similar to the user interface implementation 1420A, the user interface implementation 1420B has a large surface 1402*b*, one main view area 1404*b* and three possible buttons 1412*b*, 1414*b* and 1416*b*. In the main view area 1404*b*, there are three main components: a status bar 1406*b*, an information window 1408*b* and a confirmation button 1410*b*. The status bar 1406*b* displays a current status of the user equipment, such as a power status, a status of a connected network, a status of the user equipment's communication interface(s). The information window 1408*b* displays a list user equipment(s) and/or search assistance server(s) sending a collaborative search to the user equipment. In one implementation, each participating user equipment or each search assistance server on the list can be highlighted for indicated a choice by a user. The confirmation button 1410*b* is used to confirm the choice by the user. After the user confirms the selection, the user equipment may accept a collaborative search request sent from the user equipment or search assistance server highlighted on the information window 1408*b*.

Figure 15:
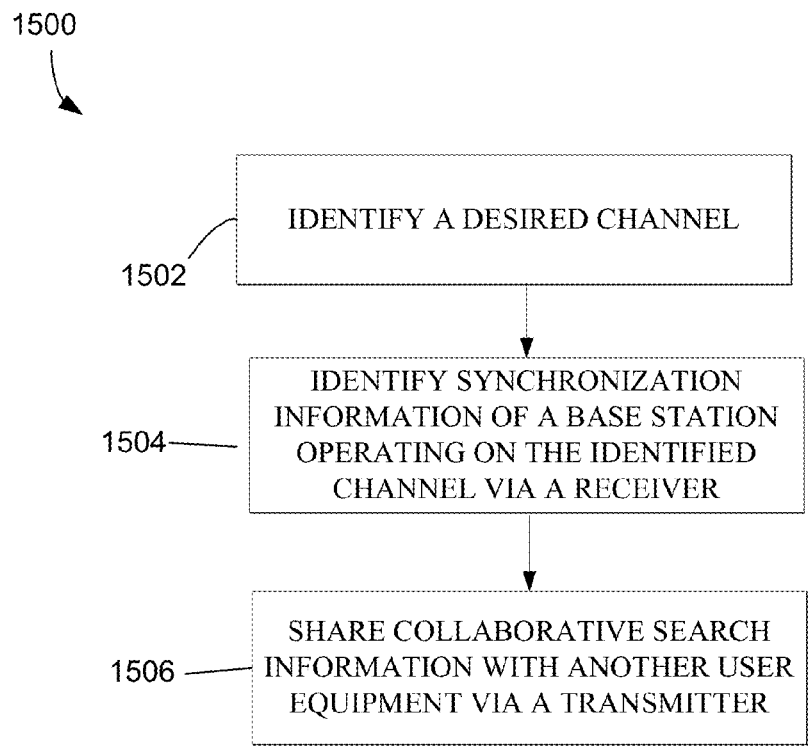
FIG. 15 illustrates a flowchart of an example of a method of wireless communications for a collaborative search

FIG. 15 illustrates a flowchart of another example of a method 1500 of wireless communication for a collaborative cell search. The method may be performed, for example, by user equipment 904*a* of FIG. 9. At block 1502, the user equipment identifies a desired channel. The means for identifying a channel may include at least one of a processing module 508. The identified channel may include at least one of a frequency, a frequency band, a frequency sub-band and a channel number. At block 1502, the user equipment identifies synchronization information of a base station (e.g., the base station 902). The means for identifying the synchronization information of the base station may include at least one of the processing module (e.g., the processing module 508 of FIG. 5) and a searcher (e.g., the searcher 506 of FIG. 5). The synchronization information of the base station may include at least one of symbol timing information, slot timing information, frame timing information, PSC or SSC. A user equipment may reduce synchronization time to a base station with using synchronization information of the base station. At block 1404, the user equipment shares data of collaborative search information with another user equipment (e.g., the user equipment 904*b* of FIG. 9). The means for sharing collaborative search information may include a transceiver (e.g., the transceiver 412 of FIG. 4). The user equipment may share the information with the another equipment through a peer-to-peer connection.

Figure 16:
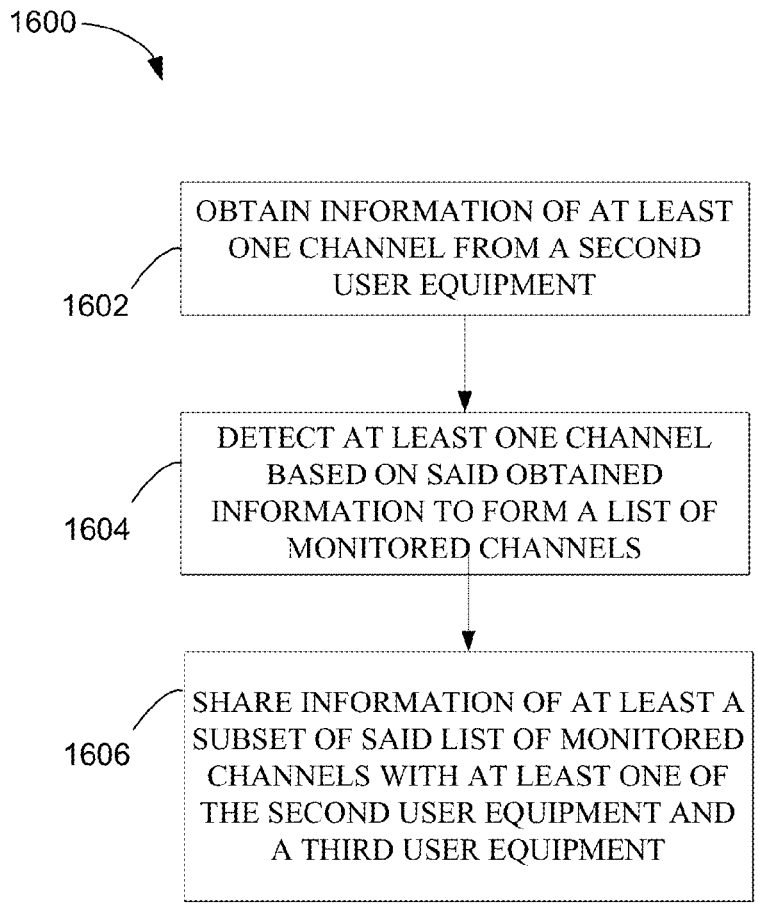
FIG. 16 shows a flowchart of another example of a method of wireless communications for a collaborative search In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

FIG. 16 is a flowchart of another exemplary method 1600 of wireless communication for a collaborative search. The method may be performed, for example, by a user equipment 904*b* of FIG. 9. At block 1602, the user equipment obtains information of at least one channel from a second user equipment (e.g., the user equipment 904*a* of FIG. 9). The means for obtaining information of at least one channel from a second user equipment may include a receiver (e.g., the receiver 312 of FIG. 3) and a processor (e.g., the processor 304 of FIG. 3). The information of a channel may include at least one of a frequency, a band, a sub-band, a channel number, PSC or SSC information of the channel. At block 1504, the user equipment detects at least one channel based on the obtained information form a list of monitored channels. The means for detecting at least one channel based on the obtained information may include at least one of a processing module (e.g., the processing module 508 of FIG. 5) and a searcher (e.g., the searcher 506 of FIG. 5). The user equipment may use the obtained information to form the list of monitored channels. The user equipment may further form synchronization information of each monitored channel. At block 1506, the user equipment shares information of at least a subset of said list of monitored channels with at least one of the second user equipment and a third user equipment (e.g., the user equipment 804 of FIG. 8). The means for sharing information may include a transceiver (e.g., the transceiver 412 of FIG. 4). The user equipment may share the information with another user equipment through a peer-to-peer connection.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the implementations disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the implementations disclosed herein and in connection with FIGS. 1-12 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some implementations to similarly designated "means for" functionality in the appended claims.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A first mobile apparatus for wirelessly communicating with a second mobile apparatus, comprising:

a memory unit configured to store communication information associated with communicating on at least one channel of a wireless network, wherein the communication information comprises synchronization timing information for at least one base station operating on the at least one channel; and a processing system operationally coupled to the memory unit and a transceiver, and configured to:
establish communications with the second mobile apparatus via a communication link;
retrieve the communication information from the memory unit;
provide at least one portion of the communication information to the second mobile apparatus via the wireless communication link;
receive at least one collaborative search request from the second mobile apparatus via the communication link, the collaborative search request identifying another portion of the communication information;
search for the another portion of the communication information via a channel search module; and
provide the another portion of the communication information to the second mobile apparatus via the communication link;
the channel search module operationally coupled to the processing system.

2. The first mobile apparatus of claim 1, wherein the communication link is a peer-to-peer communication link, and wherein the first mobile apparatus provide the at least one portion of the communication information to the second mobile apparatus via the peer-to-peer communication link.

3. The first mobile apparatus of claim 1, wherein the communication link is established via at least one access point, and wherein the first mobile apparatus provides the at least one portion of the communication information to the second mobile apparatus via the at least one access point.

4. The first mobile apparatus of claim 1, wherein the processing system is further configured to provide at least one portion of the synchronization timing information to the second mobile apparatus.

5. The first mobile apparatus of claim 1, wherein the communication information comprises at least one of symbol timing information, slot timing information, battery level of at least one user device, frame timing information, a primary scrambling code or a secondary scrambling code of at least one base station operating on the at least one channel, and wherein the processing system is further configured to provide at least one portion of the at least one of the symbol timing information, the slot timing formation, the battery level of at least one user device, the frame timing information, the primary scrambling code or the secondary scrambling code to the second mobile apparatus.

6. The first mobile apparatus of claim 1, wherein the communication information comprises a list of one or more channels having received signal strength indicator (RSSI) values larger than a threshold.

7. The first mobile apparatus of claim 1, wherein the communication information comprises location information of at least one base station, and wherein the processing system is further configured to provide at least one portion of the location information of the at least one base station to the second mobile apparatus.

8. The first mobile apparatus of claim 1, wherein the communication information comprises pseudonoise (PN) position information of at least one base station, and wherein the processing system is further configured to provide at least a portion of the PN position information of the at least one base station to the second mobile apparatus.

9. The first mobile apparatus of claim 1, wherein the another portion of the communication information comprises synchronization timing information of at least one base station operating on the at least one channel, and wherein the processing system is further configured to search for the synchronization timing information via the channel search module.

10. The first mobile apparatus of claim 1, wherein the another portion of the communication information comprises at least one of symbol timing information, slot timing formation, frame timing information, a primary scrambling code or a secondary scrambling code of at least one base station operating on the at least one channel, and wherein the processing system is further configured to search for the at least one of the symbol timing information, the slot timing formation, the frame timing information, the primary scrambling code or the secondary scrambling code via the channel search module.

11. The first mobile apparatus of claim 1, wherein the another portion of the communication information includes a list of one or more channels having received signal strength indicator (RSSI) values larger than a threshold, and wherein the processing system is further configured to search for the list of the one or more channels having good RSSI values via the channel search module.

12. The first mobile apparatus of claim 1, wherein the another portion of the communication information comprises location information of at least one base station, and wherein the processing system is further configured to search for the location information of the at least one base station via the channel search module.

13. The first mobile apparatus of claim 1, wherein the another portion of the communication information comprises pseudonoise (PN) position information of at least one base station, and wherein the processing system is further configured to search for the PN position information of the at least one base station via the channel search module.

14. The first mobile apparatus of claim 1, wherein the processing system is further configured to:
receive at least one collaborative search request from one or more other mobile apparatus via another communication link, the at least one collaborative search request identifying a further portion of the communication information of the wireless network; and
determine communication information for the first mobile apparatus to search for;
determine communication information for the one or more other mobile apparatus to search for and communicate the communication information to the one or more other mobile apparatus;
determine communication information of the wireless network;
provide at least a portion of the determined communication information to the one or more mobile apparatus; and
receive communication information of the wireless network from the one of more mobile apparatus.

15. The first mobile apparatus of claim 14, wherein determining communication information for the first mobile apparatus and the one or more mobile apparatus to search for is based at least partially on battery power level information of at least one of the first mobile apparatus or the one or more mobile apparatus.

16. The first mobile apparatus of claim 1, wherein the processing system is further configured to send a collaborative search request to a third apparatus, the collaborative search request comprising a further portion of the communication information.

17. The first mobile apparatus of claim 16, wherein the collaborative search request includes battery power level information of the one or more mobile apparatus.

18. The first mobile apparatus of claim 1, wherein the communication information comprises battery power level information of at least one of the first mobile apparatus or the second mobile apparatus.

19. A method of wireless communications, the method performed by a first user equipment, comprising:
retrieving communication information associated with communicating on at least one channel of a wireless network, wherein the communication information comprises synchronization timing information for at least one base station operating on the at least one channel;
establishing communications with a second user equipment via a communication link;
providing at least one portion of the communication information to the second user equipment via the established communication link;
receiving at least one collaborative search request from the second user equipment via the communication link, the at least one collaborative search request identifying another portion of the communication information;
searching for the another portion of the communication information via a channel search module; and
providing the another portion of the communication information to the second user equipment.

20. The method of claim 19, wherein the establishing the communications further comprises establishing the communications with the second user equipment via a peer-to-peer communication link.

21. The method of claim 19, wherein the establishing the communications further comprises establishing the communications with the second user equipment via at least one access point.

22. The method of claim 19, wherein the retrieving communication information further comprises retrieving at least one of symbol timing information, slot timing formation, frame timing information, a primary scrambling code or a secondary scrambling code of at least one base station operating on the at least one channel.

23. The method of claim 19, wherein the retrieving communication information further comprises retrieving received signal strength indicator (RSSI) information of at least one base station operating on the at least one channel.

24. The method of claim 19, wherein the retrieving communication information further comprises retrieving location information of at least one base station operating on the at least one channel.

25. The method of claim 19, wherein the retrieving communication information further comprises retrieving pseudonoise (PN) position information of at least one base station operating on the at least one channel.

26. The method of claim 19, wherein the searching for the another portion of the communication information further comprises identifying synchronization timing information of at least one base station operating on the at least one channel.

27. The method of claim 19, wherein the searching for the another portion of the communication information further comprises identifying at least one of symbol timing information, slot timing formation, frame timing information, a primary scrambling code or a secondary scrambling code of at least one base station operating on the at least one channel.

28. The method of claim 19, wherein the searching for the another portion of the communication information further comprises identifying received signal strength indicator (RSSI) information of at least one base station operating on the at least one channel.

29. The method of claim 19, wherein the searching for the another portion of the communication information further comprises identifying location information of at least one base station operating on the at least one channel.

30. The method of claim 19, further comprising:
receiving at least one collaborative search request from a third user equipment via another communication link, the at least one collaborative search request identifying a further portion of communication information; and
providing the further portion of the communication information to the second user equipment.

31. The method of claim 30, wherein the receiving at least one collaborative search request comprises receiving the at least one collaborative search request based at least partially on battery power level information of at least one of the first user equipment, the second user equipment or the third user equipment.

32. The method of claim 19, further comprising sending a collaborative search request to a third user equipment, the collaborative search request comprising a further portion of the communication information.

33. The method of claim 32, wherein the sending the collaborative search request comprises sending the collaborative search request based at least partially on battery power level information of at least one of the first user equipment, the second user equipment or the third user equipment.

34. The method of claim 19, wherein the retrieving communication information further comprises retrieving battery power level information of the first user equipment or the second user equipment, and wherein the method further comprises determining portions of a collaborative search for the first and second user equipment to perform based at least in part on battery power level information of the first and second user equipment.

35. The method of claim 19, further comprising selecting the wireless network based on a public land mobile network (PLMN) identification (ID) that is broadcast from the base station.

36. A first mobile apparatus for wirelessly communicating with a second mobile apparatus, the first mobile apparatus comprising:
means for retrieving communication information associated with communicating on at least one channel of a wireless network, wherein the communication information comprises synchronization timing information for at least one base station operating on the at least one channel;
means for establishing communications with the second mobile apparatus via a communication link;
means for providing at least a portion of the information to the second user equipment via the communication link;
means for receiving at least one collaborative search request from the second user equipment via the communication link, the at least one collaborative search request identifying another portion of the communication information; and
means for searching for the another portion of the communication information via a channel search module.

37. The first mobile apparatus of claim 36, further comprising:
means for receiving at least one collaborative search request from a third user equipment via another communication link, the at least one collaborative search request identifying a further portion of the communication information; and
means for providing the further portion of the information to the second user equipment.

38. A non-transitory computer-readable medium comprising executable code for causing a computer to:
retrieve communication information associated with communicating on at least one channel of a wireless network, wherein the communication information comprises synchronization timing information for at least one base station operating on the at least one channel;
establish communications with a second user equipment via a communication link;
provide at least one portion of the communication information to the second user equipment via the communication link;
receive at least one collaborative search request from the second user equipment via the wireless communication link, the at least one collaborative search request identifying another portion of the communication information;
search for the another portion of the communication information via a channel search module; and
provide the another portion of the communication information to the second user equipment via the communication link.

* * * * *